US012638814B2

(12) United States Patent
Horikawa et al.

(10) Patent No.: US 12,638,814 B2
(45) Date of Patent: May 26, 2026

(54) MACHINE LEARNING DEVICE

(71) Applicant: FANUC CORPORATION, Yamanashi (JP)

(72) Inventors: Yuutarou Horikawa, Yamanashi (JP); Masashi Yasuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 356 days.

(21) Appl. No.: 18/260,342

(22) PCT Filed: Jan. 7, 2022

(86) PCT No.: PCT/JP2022/000336
§ 371 (c)(1),
(2) Date: Jul. 5, 2023

(87) PCT Pub. No.: WO2022/153936
PCT Pub. Date: Jul. 21, 2022

(65) Prior Publication Data
US 2024/0302802 A1      Sep. 12, 2024

(30) Foreign Application Priority Data

Jan. 14, 2021      (JP) ................................. 2021-004401

(51) Int. Cl.
*G05B 13/02*          (2006.01)
*G01H 13/00*          (2006.01)
*G01M 99/00*          (2011.01)
(52) U.S. Cl.
CPC ......... *G05B 13/0265* (2013.01); *G01H 13/00* (2013.01); *G01M 99/005* (2013.01)
(58) Field of Classification Search
CPC ...... G05B 13/0265; G05B 2219/33034; G05B 19/4093; G01H 13/00; G01M 99/005; G06N 3/09; G06N 3/092
See application file for complete search history.

(56) References Cited

U.S. PATENT DOCUMENTS

2017/0322538 A1      11/2017      Watanabe et al.
2018/0307196 A1 *    10/2018      Oho ........................ B23Q 15/12

FOREIGN PATENT DOCUMENTS

CN          107797516 A          3/2018
CN          108732999 A  *     11/2018      ............. G05B 19/25
(Continued)

OTHER PUBLICATIONS

International Search Report issued in PCT/JP2022/000336; mailed Mar. 8, 2022.

*Primary Examiner* — Chad G Erdman
(74) *Attorney, Agent, or Firm* — Studebaker Brackett PLLC

(57)          ABSTRACT

Provided is a machine learning device capable of causing idling of a tool, and of calculating oscillation conditions that realize favorable evaluation data of finished workpieces. The machine learning device that learns oscillation conditions of a machine tool that performs oscillation cutting while oscillating a tool and a workpiece relative to each other is provided with a set conditions acquisition unit that acquires set conditions for the oscillation cutting, a label acquisition unit that acquires evaluation data of finished workpieces by the machine tool as a label, and a learning unit that performs supervised learning using a set of the set conditions and the label as training data, the learning unit being provided with a learning model for training oscillation conditions that optimize the evaluation data of the finished workpieces.

13 Claims, 12 Drawing Sheets

(56)         References Cited

FOREIGN PATENT DOCUMENTS

| | | | | | |
|---|---|---|---|---|---|
| CN | 109283887 | A | | 1/2019 | |
| CN | 110347120 | A | | 10/2019 | |
| CN | 110405532 | A | | 11/2019 | |
| CN | 111079690 | A | * | 4/2020 | ........... G06F 18/214 |
| CN | 111752214 | A | | 10/2020 | |
| JP | 2018-181217 | A | | 11/2018 | |
| JP | 2019-028597 | A | | 2/2019 | |
| JP | 6739690 | B1 | | 8/2020 | |
| JP | 2020-157425 | A | | 10/2020 | |
| JP | 6775720 | B1 | | 10/2020 | |

* cited by examiner

FIG. 5

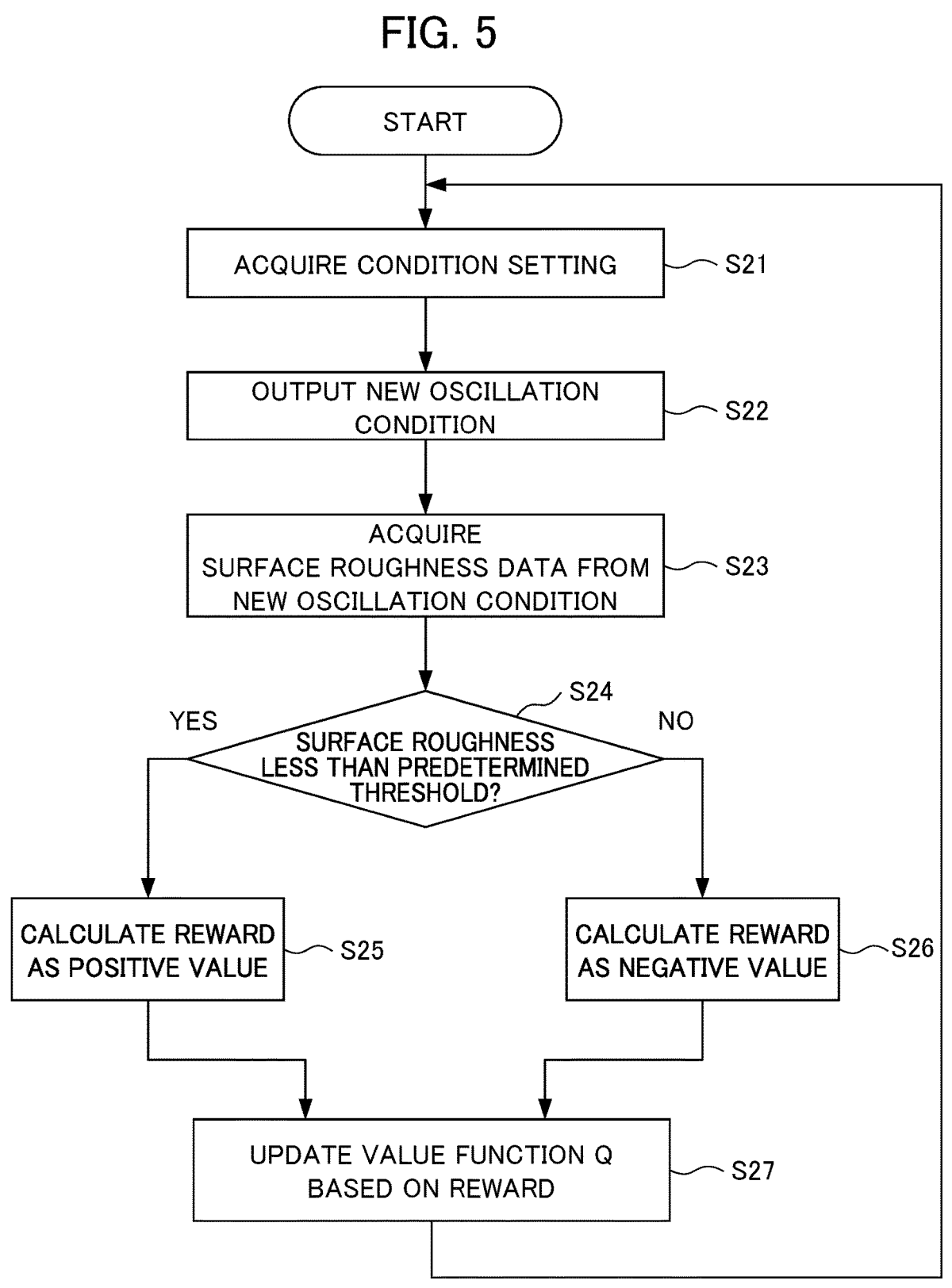

```
                    ┌─────────────┐
                    │    START    │
                    └──────┬──────┘
                           │
                           ▼
         ┌──────────────────────────────────┐
         │   ACQUIRE CONDITION SETTING       │──── S21
         └───────────────┬──────────────────┘
                         │
                         ▼
         ┌──────────────────────────────────┐
         │    OUTPUT NEW OSCILLATION         │──── S22
         │         CONDITION                 │
         └───────────────┬──────────────────┘
                         │
                         ▼
         ┌──────────────────────────────────┐
         │           ACQUIRE                 │
         │  SURFACE ROUGHNESS DATA FROM      │──── S23
         │   NEW OSCILLATION CONDITION       │
         └───────────────┬──────────────────┘
                         │
                         ▼                  S24
                  ◇────────────────◇
        YES      SURFACE ROUGHNESS        NO
        ◄──── LESS THAN PREDETERMINED ────►
              ◇    THRESHOLD?     ◇
                  ◇────────────◇
         │                            │
         ▼                            ▼
┌──────────────────┐        ┌──────────────────┐
│ CALCULATE REWARD │── S25  │ CALCULATE REWARD │── S26
│ AS POSITIVE VALUE│        │ AS NEGATIVE VALUE│
└────────┬─────────┘        └─────────┬────────┘
         │                            │
         └──────────┬─────────────────┘
                    ▼
         ┌──────────────────────────────────┐
         │   UPDATE VALUE FUNCTION Q         │──── S27
         │     BASED ON REWARD               │
         └───────────────┬──────────────────┘
```

FIG. 8

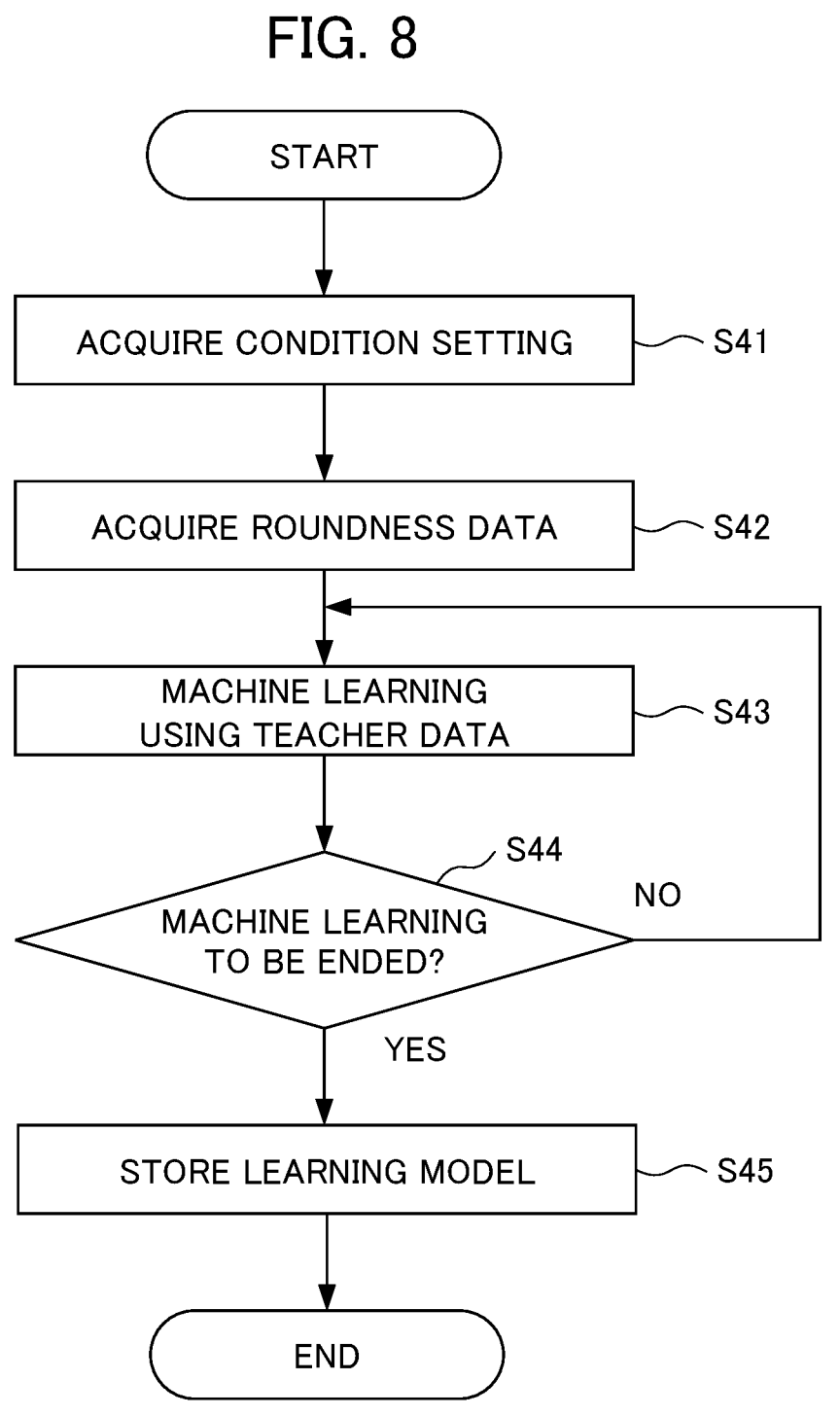

START

↓

ACQUIRE CONDITION SETTING — S41

↓

ACQUIRE ROUNDNESS DATA — S42

↓

MACHINE LEARNING
USING TEACHER DATA — S43

↓

S44
MACHINE LEARNING
TO BE ENDED? —— NO

YES

↓

STORE LEARNING MODEL — S45

↓

END

FIG. 11

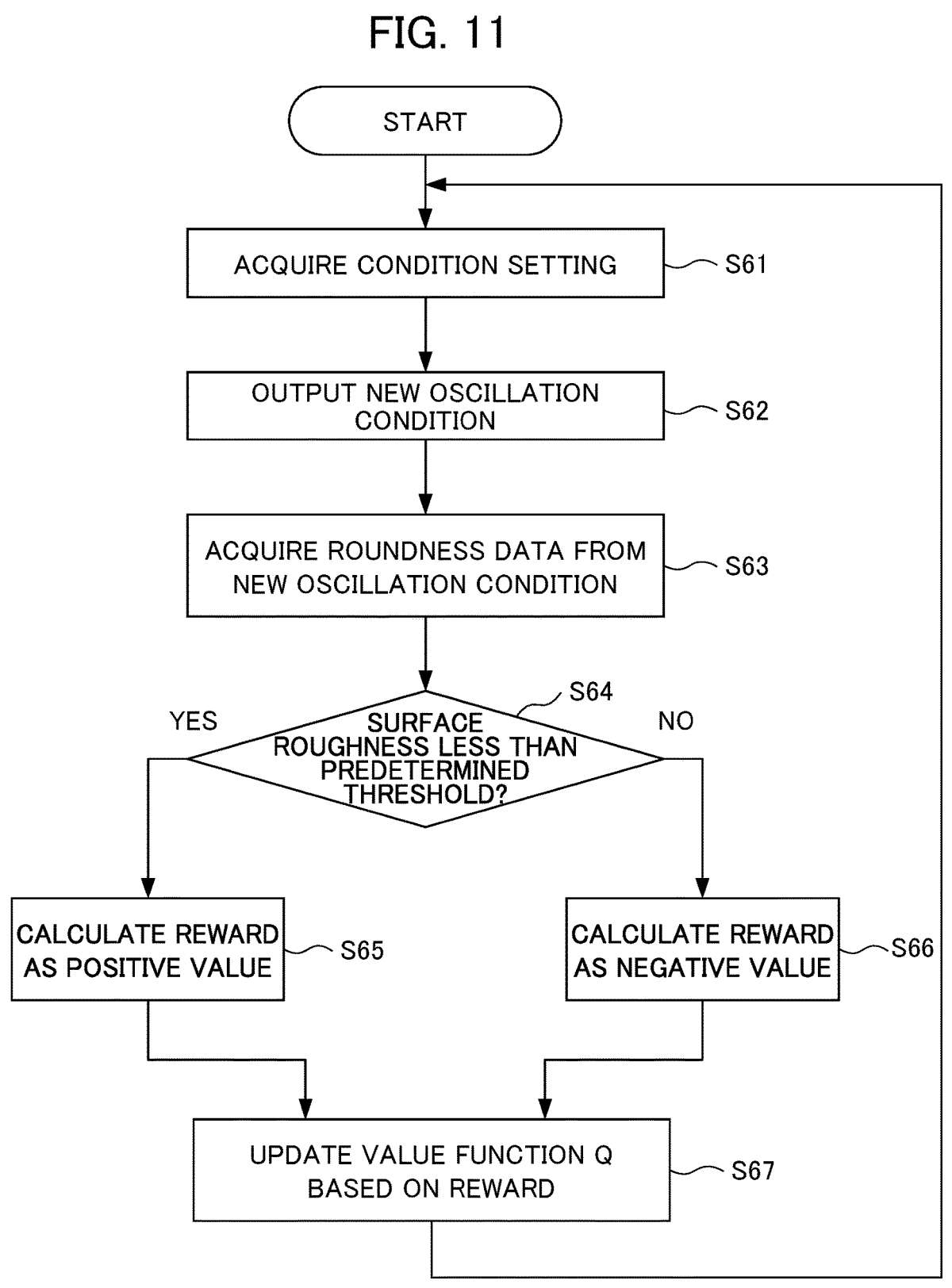

START

ACQUIRE CONDITION SETTING — S61

OUTPUT NEW OSCILLATION CONDITION — S62

ACQUIRE ROUNDNESS DATA FROM NEW OSCILLATION CONDITION — S63

S64

SURFACE ROUGHNESS LESS THAN PREDETERMINED THRESHOLD?

YES

NO

CALCULATE REWARD AS POSITIVE VALUE — S65

CALCULATE REWARD AS NEGATIVE VALUE — S66

UPDATE VALUE FUNCTION Q BASED ON REWARD — S67

FIG. 12

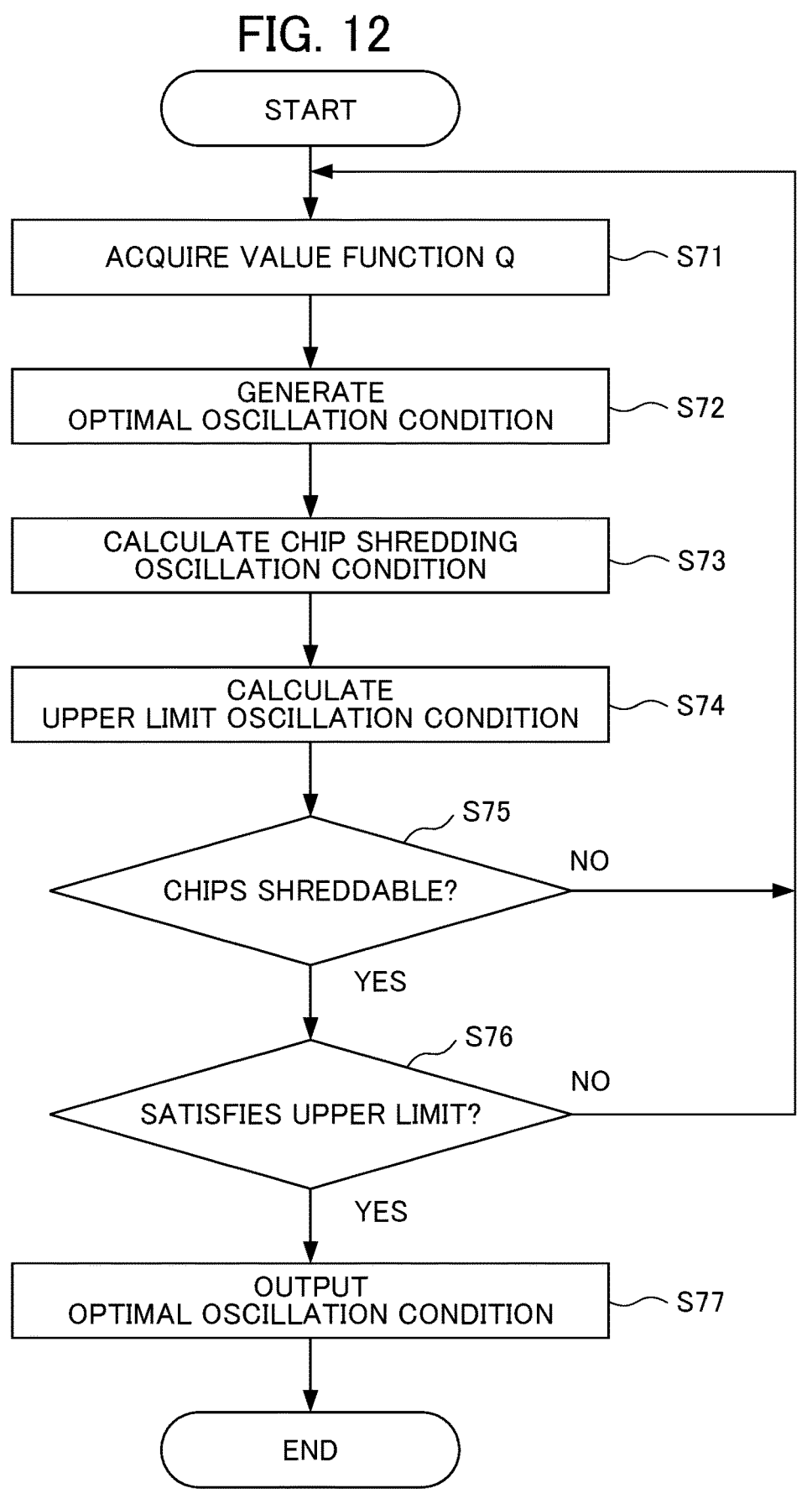

START

ACQUIRE VALUE FUNCTION Q ~ S71

GENERATE
OPTIMAL OSCILLATION CONDITION ~ S72

CALCULATE CHIP SHREDDING
OSCILLATION CONDITION ~ S73

CALCULATE
UPPER LIMIT OSCILLATION CONDITION ~ S74

S75
CHIPS SHREDDABLE? — NO

YES

S76
SATISFIES UPPER LIMIT? — NO

YES

OUTPUT
OPTIMAL OSCILLATION CONDITION ~ S77

END

MACHINE LEARNING DEVICE

TECHNICAL FIELD

The present invention relates to a machine learning device.

BACKGROUND ART

Conventionally, oscillation cutting has been known, in which cutting is performed while a workpiece and a cutting tool are being sent in a machining direction, and at the same time, the workpiece and the cutting tool are oscillated relative to each other (see, e.g., Patent Document 1). In oscillation cutting, in order to shred chips, an oscillation condition such as a frequency and an amplitude needs to be set such that air cutting with the tool is performed for the workpiece at regular intervals.

An operator checks the waveform of the set oscillation condition, thereby checking whether or not there is a inter- section between a previous path and a current path, i.e., whether or not chip cutting is performed.

Patent Document 1: Japanese Unexamined Patent Application, Publication No. 2019-28597

DISCLOSURE OF THE INVENTION

Problems to be Solved by the Invention

Evaluation data regarding the finished machined work-piece, such as the surface roughness, roundness, and dimensional accuracy of the workpiece machined by oscillation cutting, is often degraded as compared to that when oscillation cutting is not applied. This is because of, e.g., vibration in oscillation cutting and a change in a cutting amount, but a mechanism of degrading the evaluation data is very complex. For these reasons, there has been a demand for calculation of an oscillation condition where air cutting with a tool can be performed and favorable evaluation data on a machined workpiece can be obtained.

Means for Solving the Problems

A machine learning device according to one aspect of the present disclosure is a machine learning device for learning an oscillation condition for a machine tool that performs oscillation machining while oscillating a tool and a workpiece relative to each other. The machine learning device includes a condition setting acquisition unit that acquires a condition setting for the oscillation machining, a label acquisition unit that acquires, as a label, evaluation data on the workpiece machined with the machine tool, and a learning unit that performs supervised learning using a pair of condition setting and label as teacher data. The learning unit includes a learning model for learning an oscillation condition where the evaluation data on the machined work-piece is optimized.

A machine learning device according to one aspect of the present disclosure is a machine learning device for learning an oscillation condition for a machine tool that performs oscillation machining while oscillating a tool and a work-piece relative to each other. The machine learning device includes a condition setting acquisition unit that acquires, as condition information, a condition setting for the oscillation machining, a determination information acquisition unit that acquires, as determination information, evaluation data on the workpiece machined with the machine tool, an action information output unit that outputs action information indicating how to change the oscillation condition from a current condition, a reward calculation unit that calculates the value of a reward in reinforcement learning based on the determination information, a value function update unit that updates a value function for setting the value of the oscillation condition for the machine tool based on the condition information, the action information, and the reward, and an oscillation condition output unit that outputs, based on the value function, an optimal oscillation condition where the evaluation data on the machined workpiece is optimized.

Effects of the Invention

According to the present invention, the oscillation condition can be calculated, where air cutting with the tool can be performed and favorable evaluation data on the machined workpiece can be obtained.

BRIEF DESCRIPTION OF THE DRAWINGS

FIG. 5 is a flowchart showing the flow of value function update processing by a machine learning device according to the second embodiment;

FIG. 8 is a flowchart showing the flow of learning model building processing by a machine learning device according to the third embodiment;

FIG. 11 is a flowchart showing the flow of value function update processing by a machine learning device according to the fourth embodiment; and FIG. 12 is a flowchart showing the flow of oscillation condition output processing by the machine learning device according to the fourth embodiment.

PREFERRED MODE FOR CARRYING OUT THE INVENTION

First Embodiment

Figure 1:
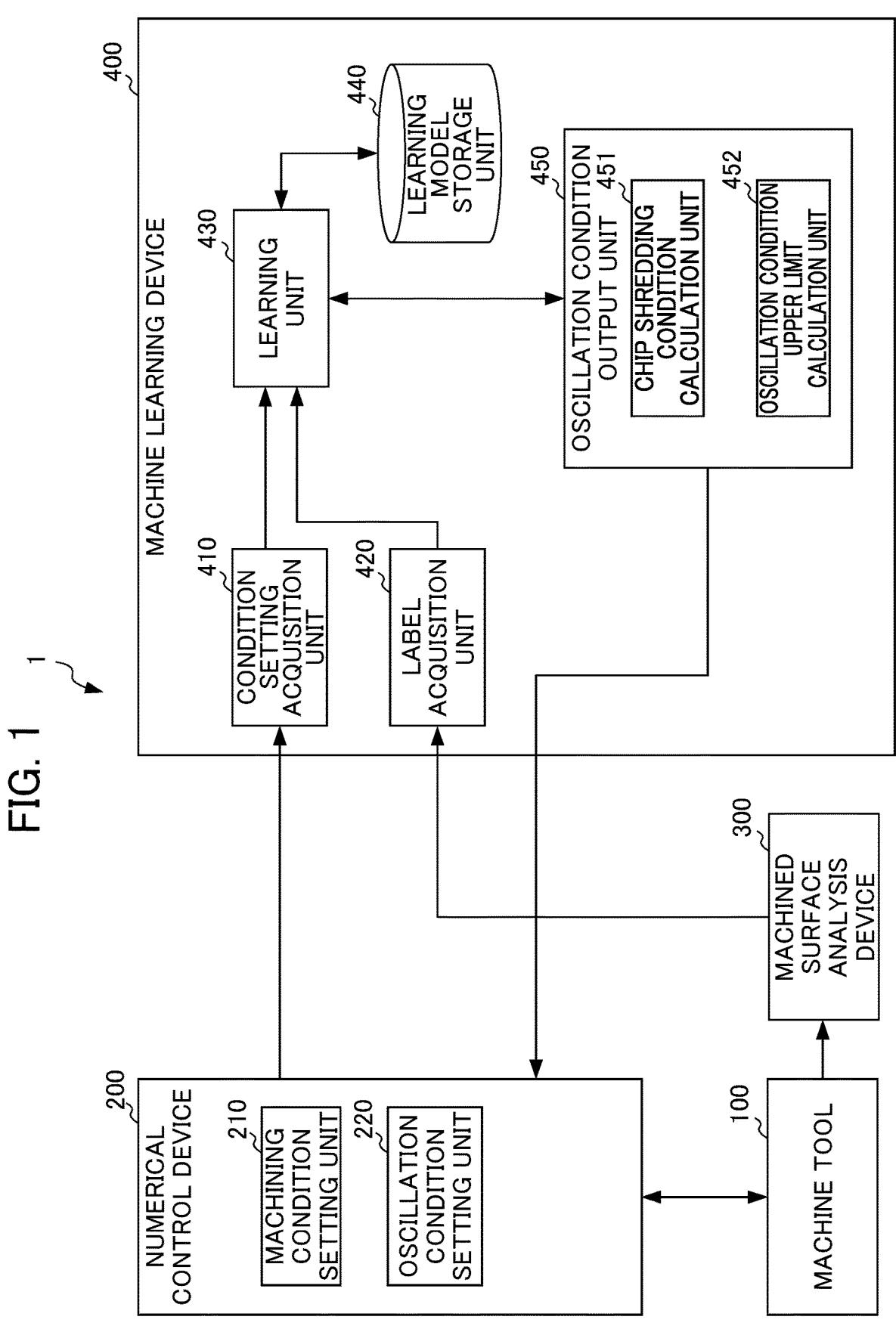
FIG. 1 is a diagram showing the outline of a control system according to a first embodiment.

Hereinafter, one example of an embodiment of the present invention will be described. FIG. 1 is a diagram showing the outline of a control system 1 according to a first embodiment. The control system 1 is intended to calculate an oscillation condition using machine learning to calculate an oscillation condition where air cutting can be performed with a tool of a machine tool 100 and favorable evaluation data on a machined workpiece can be obtained. Particularly, the control system 1 according to the first embodiment is intended to calculate an oscillation condition using machine learning to calculate an oscillation condition where air cutting can be performed with the tool of the machine tool 100 and favorable surface roughness data can be obtained.

The control system 1 includes the machine tool 100, a numerical control device 200, a machined surface analysis device 300, and a machine learning device 400. Here, the machine tool 100 and the numerical control device 200 are paired and connected so as to communicate with each other. Note that the machine tool 100 and the numerical control device 200 may be directly connected to each other via a connection interface or be connected to each other via a network such as a local area network (LAN).

The numerical control device 200, the machined surface analysis device 300, and the machine learning device 400 are directly connected to each other via connection interfaces or connected to each other via a network so as to communicate with each other. Note that the network includes, for example, a LAN built in a factory, the Internet, the public telephone network, or a combination thereof. A specific communication method in the network, a connection method, i.e., wired connection or wireless connection, etc. are not particularly limited.

The machine tool 100 machines a workpiece using oscillation cutting according to control by the numerical control device 200. The machine tool 100 has a general configuration for performing oscillation cutting, such as the tool, a main axis, and a feed axis.

The numerical control device 200 is a device for controlling the machine tool 100. The numerical control device 200 includes a machining condition setting unit 210 and an oscillation condition setting unit 220.

The machining condition setting unit 210 sets a condition setting including a machining condition and an oscillation condition for performing oscillation machining with the machine tool 100. The machining condition setting unit 210 outputs the set condition setting to the machine learning device 400. Here, the condition setting includes a machining condition including at least one selected from a tool feed speed, a rotation speed about the main axis, a coordinate value, a tool blade edge, or a tool type in the machine tool 100 and a workpiece material, and an oscillation condition including at least one selected from the oscillation frequency or oscillation amplitude of the machine tool 100.

The oscillation condition setting unit 220 sets, in the numerical control device 200, the oscillation condition output from the machine learning device 400, and outputs the oscillation condition to the machine tool 100.

The machined surface analysis device 300 measures and calculates surface roughness data on the workpiece machined with the machine tool 100, and outputs the calculated surface roughness data to the machine learning device 400. The surface roughness data includes, for example, at least one selected from an arithmetic average roughness, the maximum height, the maximum peak height, the maximum valley depth, an average height, the maximum peak-to-valley height, or a load length ratio.

Note that the tool oscillates periodically in oscillation cutting, and therefore, the surface roughness of the workpiece (e.g., in a cylindrical shape) varies by location. For this reason, in measurement of the surface roughness data, a line roughness needs to be measured multiple times for a cylindrical side surface of the workpiece. For calculation of the surface roughness data, e.g., a method in which the line roughness is measured for a plurality of locations on the cylindrical side surface and an average surface roughness is calculated therefrom (the arithmetic average roughness Ra) or a method in which the line roughness is measured for a plurality of locations on the cylindrical side surface and the maximum value of the line roughness is calculated therefrom (the maximum height Rz) may be used.

The machine learning device 400 performs machine learning using the condition setting received from the numerical control device 200 and the surface roughness data received from the machined surface analysis device 300. By machine learning, the machine learning device 400 builds a learning model for outputting the oscillation condition. The machine learning device 400 includes a condition setting acquisition unit 410, a label acquisition unit 420, a learning unit 430, a learning model storage unit 440, and an oscillation condition output unit 450.

The condition setting acquisition unit 410 acquires, from the numerical control device 200, the condition setting including the machining and oscillation conditions for oscillation machining.

The label acquisition unit 420 acquires, as a label, the surface roughness data on the workpiece machined with the machine tool 100 from the machined surface analysis device 300. Here, the label is correct output corresponding to input in machine learning.

In this manner, the condition setting for oscillation machining and the label of the surface roughness data are paired as a learning target and input to the learning unit 430. This pair of condition setting and label is equivalent to teacher data in machine learning. Many pieces of teacher data for machine learning are preferably prepared.

The learning unit 430 performs machine learning based on the received teacher data, thereby building the learning model. That is, the learning unit 430 learns the oscillation condition for optimizing the surface roughness of the machined workpiece. The learning model built by the learning unit 430 is output to the learning model storage unit 440.

The learning model storage unit 440 stores the learning model learnt by the learning unit 430. The learning model stored in the learning model storage unit 440 is utilized by the oscillation condition output unit 450. Note that in a case where the teacher data is newly acquired after the learning model has been built, the learning unit 430 may further perform supervised learning on the learning model stored in the learning model storage unit 440, thereby updating the learning model built once.

The machine learning device 400 may share the learning model stored in the learning model storage unit 440 with other machine learning devices. In a case where the learning model is shared by the plurality of machine learning devices, supervised learning can be further performed in a distributed manner by the machine learning devices, and therefore, the efficiency and accuracy of supervised learning can be improved.

The oscillation condition output unit 450 outputs, based on the learning model stored in the learning model storage unit 440, an optimal oscillation condition where the surface roughness of the machined workpiece is optimized. The oscillation condition output unit 450 has a chip shredding condition calculation unit 451 and an oscillation condition upper limit calculation unit 452.

The chip shredding condition calculation unit 451 calculates a chip shredding oscillation condition where chips from the workpiece can be shredded by oscillation machining with the machine tool 100. The oscillation condition output unit 450 outputs, based on the learning model, the optimal oscillation condition satisfying the chip shredding oscillation condition. Here, for calculation of the chip shredding oscillation condition, an oscillation condition combination where the chips can be shredded may be held in advance as table data, or an oscillation condition relational expression may be calculated such that an overlap of a previous path and a current path is formed on a machining path calculated based on the oscillation condition.

The oscillation condition upper limit calculation unit 452 calculates an upper limit oscillation condition not exceeding a preset upper limit. The oscillation condition output unit 450 outputs, based on the learning model, the optimal oscillation condition satisfying the upper limit oscillation condition. Here, the preset upper limit indicates, for example, the upper limit of a frequency or an amplitude in oscillation machining or the upper limit of a speed or an acceleration in oscillation machining. For determining whether or not the upper limit oscillation condition is satisfied, various upper limits may be held as parameters or be specified by a machining program, or the speed or the acceleration may be calculated from the oscillation condition (the frequency and the amplitude), for example.

Figure 2:
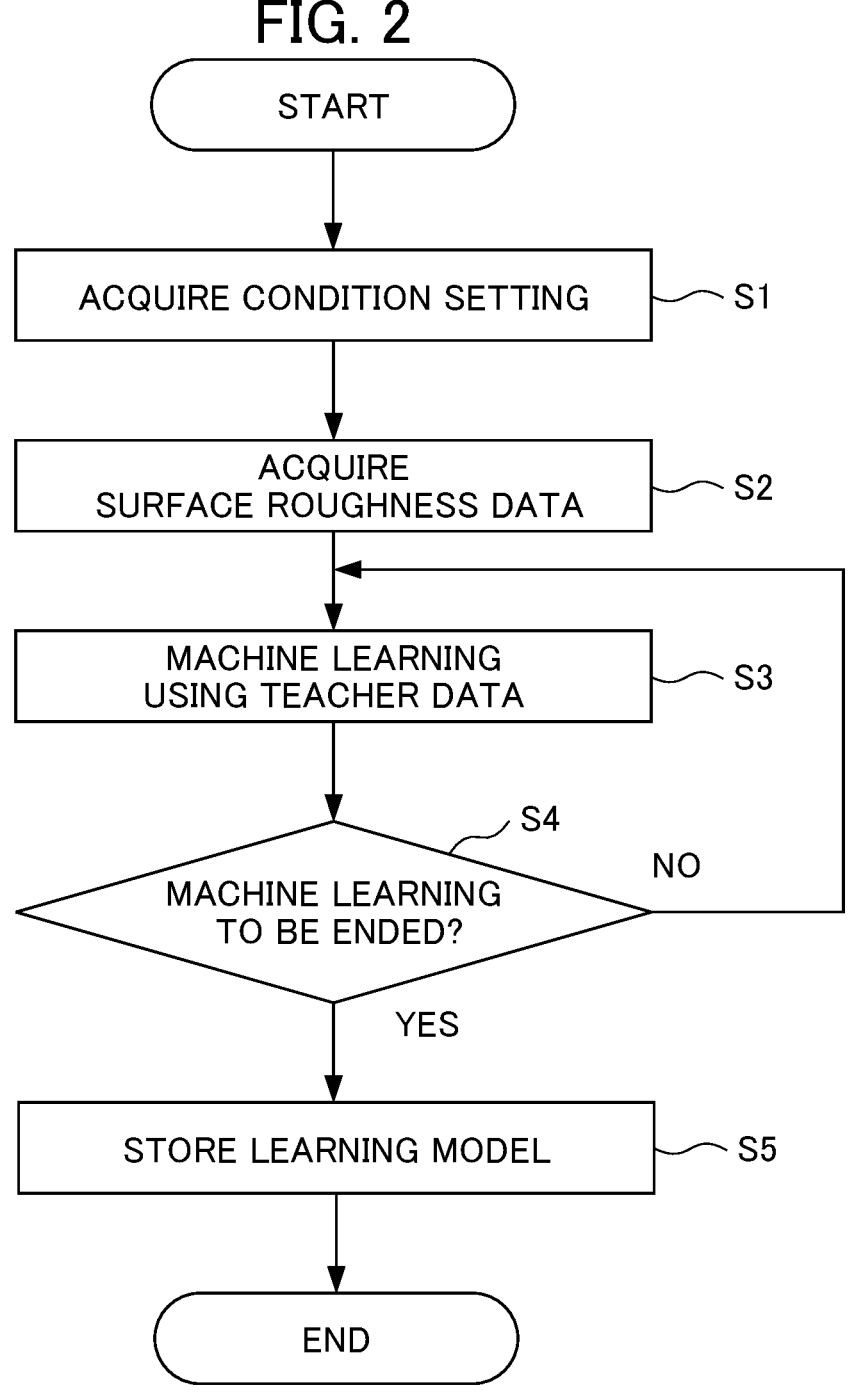
FIG. 2 is a flowchart showing the flow of learning model building processing by a machine learning device according to the first embodiment.

Next, processing of building the learning model by the machine learning device 400 will be described with reference to a flowchart of FIG. 2. FIG. 2 is the flowchart showing the flow of the learning model building processing by the machine learning device 400 according to the first embodiment.

In Step S1, the condition setting acquisition unit 410 acquires, from the numerical control device 200, the condition setting including the machining and oscillation conditions for oscillation machining.

In Step S2, the label acquisition unit 420 acquires, as the label, the surface roughness data on the workpiece machined with the machine tool 100 from the machined surface analysis device 300.

In Step S3, after having received the teacher data which is the pair of condition setting and label, the learning unit 430 executes machine learning based on the received teacher data. The learning unit 430 executes machine learning using the received teacher data. The learning unit 430 performs supervised learning by, e.g., regression analysis, a neural network, a least-squares method, or a stepwise method.

Supervised learning may be performed by online learning, batch learning, or mini-batch learning. Online learning is a learning method in which supervised learning is promptly performed every time a feature is extracted from voice data, a label is input, and teacher data is created therefrom. Batch learning is a learning method in which multiple pieces of teacher data are collected while a process of extracting a feature from voice data, inputting a label, and creating teacher data therefrom is repeated and supervised learning is performed using all the collected pieces of teacher data.

Further, mini-batch learning is an intermediate learning method between online learning and batch learning, in which supervised learning is performed every time a certain amount of teacher data is accumulated.

In Step S4, the learning unit 430 determines whether or not supervised learning is to be ended. Here, a condition for ending supervised learning can be set as necessary. For example, in a case where the value of an error between the output of the neural network and the label is a predetermined value or less, the learning unit 430 may end supervised learning. In a case where supervised learning has been repeated a preset number of times, the learning unit 430 may end supervised learning. In a case where supervised learning is to be ended (YES), the processing proceeds to Step S5. On the other hand, in a case where supervised learning is not to be ended (NO), the processing proceeds to Step S3.

In Step S5, the learning unit 430 outputs the learning model built up to this point by supervised learning to the learning model storage unit 440, and the learning model storage unit 440 stores the learning model. In a case where new teacher data has been acquired, the machine learning device 400 can further perform machine learning for the learning model. Thereafter, the machine learning device 400 ends this processing.

Figure 3:
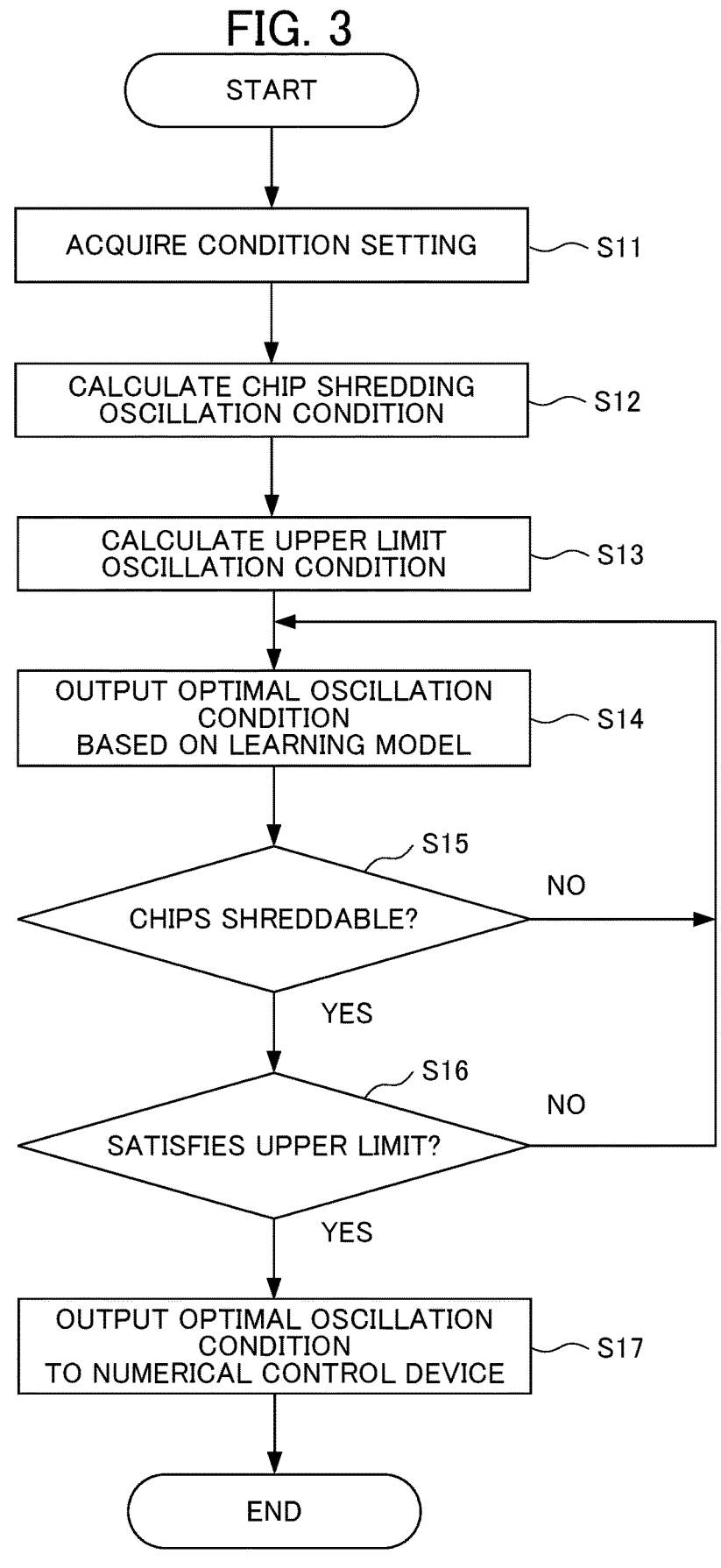
FIG. 3 is a flowchart showing the flow of oscillation condition output processing by the machine learning device according to the first embodiment.

Next, processing of outputting the oscillation condition by the machine learning device 400 will be described with reference to a flowchart of FIG. 3. FIG. 3 is the flowchart showing the flow of the oscillation condition output processing by the machine learning device 400 according to the first embodiment.

In Step S11, the condition setting acquisition unit 410 acquires, from the numerical control device 200, the condition setting including the machining and oscillation conditions for oscillation machining.

In Step S12, the chip shredding condition calculation unit 451 calculates the chip shredding oscillation condition where the chips from the workpiece can be shredded by oscillation machining with the machine tool 100. In Step S13, the oscillation condition upper limit calculation unit 452 calculates the upper limit oscillation condition not exceeding the preset upper limit.

In Step S14, the oscillation condition output unit 450 outputs the optimal oscillation condition where the surface roughness of the machined workpiece is optimized, based on the condition setting acquired in Step S11 and the learning model stored in the learning model storage unit 440.

In Step S15, the oscillation condition output unit 450 determines whether or not the optimal oscillation condition output in Step S13 satisfies the chip shredding oscillation condition calculated in Step S12. In a case where the optimal oscillation condition satisfies the chip shredding oscillation condition (YES), the processing proceeds to Step S16. On the other hand, in a case where the optimal oscillation condition does not satisfy the chip shredding oscillation condition (NO), the processing proceeds to Step S14 again.

In Step S16, the oscillation condition output unit 450 determines whether or not the optimal oscillation condition output in Step S13 satisfies the upper limit oscillation condition calculated in Step S13. In a case where the optimal oscillation condition satisfies the upper limit oscillation condition (YES), the processing proceeds to Step S16. On the other hand, in a case where the optimal oscillation condition does not satisfy the upper limit oscillation condition (NO), the processing proceeds to Step S14 again.

In Step S17, the oscillation condition output unit 450 outputs the optimal oscillation condition to the numerical control device 200, and thereafter, the processing ends.

As described above, the machine learning device 400 according to the first embodiment includes the condition setting acquisition unit 410 that acquires the condition setting for oscillation machining, the label acquisition unit 420 that acquires, as the label, the surface roughness data on the workpiece machined with the machine tool 100, and the learning unit 430 that performs supervised learning using the pair of condition setting and label as the teacher data. The learning unit 430 includes the learning model for learning the oscillation condition where the surface roughness of the machined workpiece is optimized.

With this configuration, the machine learning device 400 can learn the optimal oscillation condition which is optimized in consideration of the surface roughness as compared to a conventional technique in which an oscillation condition is difficult to be set considering a surface roughness.

The machine learning device 400 further includes the oscillation condition output unit 450 that outputs, based on the learning model, the optimal oscillation condition where the surface roughness of the machined workpiece is optimized. With this configuration, the machine learning device 400 can output the optimal oscillation condition which is optimized in consideration of the surface roughness as compared to the conventional technique in which the oscillation condition is difficult to be set considering the surface roughness. Moreover, the machine learning device 400 can automatically set the oscillation condition, and therefore, a burden on an operator can be reduced.

The oscillation condition output unit 450 includes the chip shredding condition calculation unit 451 that calculates the chip shredding oscillation condition where the chips from the workpiece can be shredded, and the oscillation condition output unit 450 outputs, based on the learning model, the optimal oscillation condition satisfying the chip shredding oscillation condition. With this configuration, the machine learning device 400 can set the optimal oscillation condition which allows shredding of the chips and which is optimized in consideration of the surface roughness.

The oscillation condition output unit 450 includes the oscillation condition upper limit calculation unit 452 that calculates the upper limit oscillation condition not exceeding the preset upper limit, and the oscillation condition output unit 450 outputs, based on the learning model, the optimal oscillation condition satisfying the upper limit oscillation condition. With this configuration, the machine learning device 400 can set the optimal oscillation condition which allows shredding of the chips and which is optimized in consideration of the surface roughness, not exceeding the upper limit of the oscillation condition.

Second Embodiment

Next, a control system 10 according to a second embodiment will be described. Note that in description of the second embodiment, the same reference numerals are used to represent the same components as those of the first embodiment and description thereof will be omitted or simplified. The control system 10 according to the second embodiment is mainly different from the first embodiment in that reinforcement learning is used instead of supervised learning, and is similar to the first embodiment in the other components.

Figure 4:
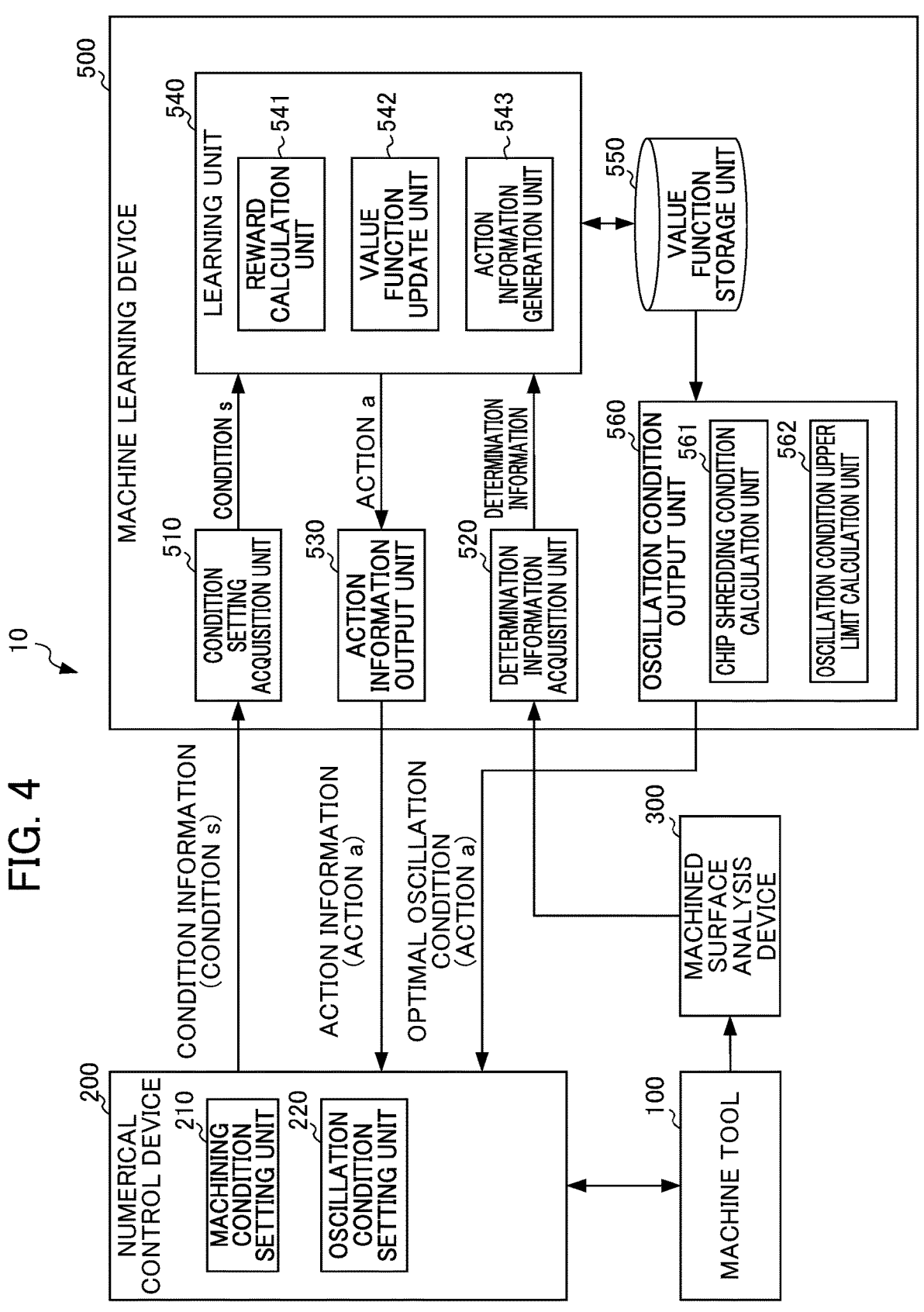
FIG. 4 is a diagram showing the outline of a control system according to a second embodiment.

FIG. 4 is a diagram showing the outline of the control system 10 according to the second embodiment. The control system 10 is intended to calculate an oscillation condition using machine learning to calculate an oscillation condition where air cutting can be performed with a tool of a machine tool 100 and favorable surface roughness data can be obtained.

The control system 1 includes the machine tool 100, a numerical control device 200, a machined surface analysis device 300, and a machine learning device 500. Here, the machine tool 100 and the numerical control device 200 are paired and connected so as to communicate with each other. Note that the machine tool 100 and the numerical control device 200 may be directly connected to each other via a connection interface or be connected to each other via a network such as a local area network (LAN).

The numerical control device 200, the machined surface analysis device 300, and the machine learning device 500 are directly connected to each other via connection interfaces or connected to each other via a network so as to communicate with each other. Note that the network includes, for example, a LAN built in a factory, the Internet, the public telephone network, or a combination thereof. A specific communication method in the network, a connection method, i.e., wired connection or wireless connection, etc. are not particularly limited.

The machine tool 100, the numerical control device 200, and the machined surface analysis device 300 have configurations similar to those of the first embodiment as described above.

The machine learning device 500 is a device that performs reinforcement learning. In advance of description of each functional block included in the machine learning device 500, the basic mechanism of reinforcement learning will be first described. An agent (equivalent to the machine learning device 500 in the present embodiment) observes an environmental condition and selects a certain action, and the environment changes based on this action. As a result of the environment changes, some kind of reward is given to the agent, and the agent learns to select (make decision) a better action. Supervised learning provides a fully-correct answer, and on the other hand, the reward in reinforcement learning is often a fragmentary value based on a partial environmental change. For this reason, the agent learns to select the action such that the total reward is maximized into the future.

As described above, by action learning in reinforcement learning, a proper action is learnt in light of interaction between the environment and the action, i.e., a method for maximizing the reward in the future is learnt. In the present embodiment, this indicates, for example, that an action influencing the future, which is an action of selecting action information for shortening a delivery time T and shortening an open time T2, can be selected.

Here, an arbitrary learning method can be used as reinforcement learning, but a case where Q-learning which is a method for learning a value $Q(s,a)$ of selecting an action a under a certain environmental condition s is used will be described as an example in description below. Q-learning is intended to select, as an optimal action, an action a with the highest value $Q(s,a)$ from actions a conceivable under the certain condition s.

However, when Q-learning is first started, no correct value $Q(s,a)$ for the combination of the condition s and the action a is known at all. For this reason, the agent selects various actions a under the certain condition s, and based on rewards given as a result of these actions a, selects a better action to learn a correct value $Q(s,a)$.

In order to maximize the total reward given into the future, the agent aims to finally obtain the value $Q(s,a)=E[\Sigma(\gamma^t)r_t]$. Here, $E[\ ]$ indicates an expectation, t indicates a time point, $\gamma$ indicates a parameter called a later-described discount, $r_t$ indicates a reward at the time point t, and $\Sigma$ indicates the total reward at the time point t. The expectation in this expression is an expectation in a case where the condition has changed according to the optimal action. However, in the course of Q-learning, it is not sure which action is optimal, and for this reason, reinforcement learning is performed in such a manner that the action is searched while various actions are made. An update expression for the value $Q(s,a)$ can be, for example, expressed as in Expression (1) below.

[Expression 1]

$$Q(s_{t+1}, a_{t+1}) \leftarrow Q(s_t, a_t) + q\left(r_{t+1} + \gamma \max_a Q(s_{t+1}, a) - Q(s_t, a_t)\right) \quad (1)$$

In Expression (1) above, $s_t$ indicates an environmental condition at the time point t, and $a_t$ indicates an action at the time point t. As a result of the action at, the condition changes to $s_{t+1}$. Indicated by $r_{t+1}$ is a reward given as a result of the condition change. A term with max is obtained in such a manner that a Q-value when an action a with the highest Q-value known at this point has been selected under the condition $s_{t+1}$ is multiplied by $\gamma$. Here, $\gamma$ is a parameter of $0 < \gamma \leq 1$, and is called a discount. Moreover, $\alpha$ is a learning coefficient, and is in a range of $0 < \alpha \leq 1$.

Expression (1) above indicates a method for updating the value $Q(s_t, a_t)$ of the action at under the condition $s_t$ based on the reward $r_{t+1}$ given as a result of the trial $a_t$. This update expression indicates that the value Q $(s_t, a_t)$ is increased when the value $\max_a Q(s_{t+1}, a_t)$ of the best action under the subsequent condition $s_{t+1}$ as a result of the action at is greater than the value $Q(s_t, a_t)$ of the action at under the condition $s_t$ and is decreased when the value $\max_a Q(s_{t+1}, a)$ is smaller than the value $Q(s_t, a_t)$. That is, the value of a certain action under a certain condition is adjusted closer to the value of the best action under a subsequent condition as a result of the certain action. Note that a difference therebetween varies by the discount $\gamma$ and the reward $r_{t+1}$, but basically, the value of the best action under a certain condition propagates to the value of an action under the last condition before such a best action.

Here, for Q-learning, there is a method in which a table of the values Q(s,a) is created for all the condition-action pairs (s,a) and learning is performed using this table. However, there are too many conditions for obtaining all the values Q(s,a) of the condition-action pairs, and it might take considerable time to complete Q-learning.

For this reason, a well-known technique called deep Q-network (DQN) may be utilized. Specifically, a value function Q may be obtained using an appropriate neural network, and the parameters of the neural network may be adjusted. The value Q(s,a) may be calculated in such a manner that the value function Q is approximated using the appropriate neural network. Utilizing DQN, the time required for completing Q-learning can be shortened. Note that DQN is described in detail in the following non-patent document, for example.

Non-Patent Document

"Human-level control through deep reinforcement learning", Volodymyr Mnih1 [online], [searched on Dec. 15, 2020], the Internet <URL:http://files.davidqiu.com/research/nature14236.pdf>

The machine learning device 500 performs Q-learning as described above. Specifically, the machine learning device 500 learns the value function Q selected taking a condition setting (e.g., a machining condition and an oscillation condition) set in the numerical control device 200 as the condition s and taking a change in the oscillation condition, i.e., the condition s, in the numerical control device 200 as the action a.

The machine learning device 500 observes the condition s, such as the condition setting (e.g., the machining and oscillation conditions), set in the numerical control device 200, thereby determining the action a. The machine learning device 500 receives a reward every time the action a is made. The machine learning device 500 searches the optimal action a through trial and error such that the total reward is maximized into the future. In this manner, the machine learning device 500 can select the optimal action a for the condition s, such as the condition setting (e.g., the machining and oscillation conditions), set in the numerical control device 200.

That is, based on the value function Q learnt by the machine learning device 500, the action a with the maximum value of the value function Q is selected from the actions a applied to the condition setting (e.g., the machining and oscillation conditions) under the certain condition s, so that the action a from which surface roughness data is minimized (optimized) can be selected.

In order to perform reinforcement learning as described above, the machine learning device 500 includes a condition setting acquisition unit 510, a determination information acquisition unit 520, an action information output unit 530, a learning unit 540, a value function storage unit 550, and an oscillation condition output unit 560.

From the numerical control device 200, the condition setting acquisition unit 510 acquires, as condition information (the condition s), the condition setting (e.g., the machining and oscillation conditions) set in the numerical control device 200. The condition s is equivalent to the environmental condition s in Q-learning.

Specifically, the condition s in the second embodiment indicates the condition setting (e.g., the machining and oscillation conditions) set in the numerical control device 200. The condition setting includes a machining condition including the rotation speed of the machine tool 100 about a main axis, the feed speed of the machine tool 100, etc. and an oscillation condition including the oscillation amplitude, oscillation frequency, etc. of the machine tool 100.

The determination information acquisition unit 520 acquires determination information for calculating the reward in Q-learning. Specifically, the determination information acquisition unit 520 acquires, as the determination information for calculating the reward in Q-learning, surface roughness data on a workpiece machined with the machine tool 100.

The action information output unit 530 transmits action information (the action a) generated by the learning unit 540 to the numerical control device 200. As described above, the numerical control device 200 changes the current condition s, i.e., the currently-set condition setting, based on the action a, thereby causing the condition s to transition to a subsequent condition s' (i.e., a condition when the machine tool 100 is operated under the changed oscillation condition).

The learning unit 540 learns the value Q(s,a) when the certain action a is selected under the certain environmental condition s. Specifically, the learning unit 540 includes a reward calculation unit 541, a value function update unit 542, and an action information generation unit 543.

The reward calculation unit 541 calculates, based on the determination information, the reward when the action a is selected under the certain condition s. Here, the reward calculation unit 541 calculates the reward as a positive value when the surface roughness data on the machined workpiece is less than a predetermined threshold, and calculates the reward as a negative value when the surface roughness data exceeds the predetermined threshold.

The reward calculation unit 541 determines the predetermined threshold based on a theoretical surface roughness approximate expression. Specifically, the reward calculation unit 541 determines, as the predetermined threshold, a value obtained by multiplying the theoretical surface roughness approximate expression by a compensation coefficient a. Here, the predetermined threshold is expressed by $a \cdot F^2/8R$, and F indicates a feed amount [mm] and R indicates a tool radius.

The value function update unit 542 performs Q-learning based on the condition s, the action a, the condition s' when the action a is applied to the condition s, and the value of the reward calculated as described above, thereby updating the value function Q stored in the value function storage unit 550.

The value function Q may be updated by online learning, batch learning, or mini-batch learning. Online learning is a learning method in which the value function Q is promptly updated every time the condition s transitions to the new condition s' as a result of application of the certain action a to the current condition s.

Batch learning is a learning method in which learning data is collected while transition of the condition s to the new condition s' as a result of application of the certain action a to the current condition s is repeated and the value function Q is updated using all the collected pieces of learning data. Further, mini-batch learning is an intermediate learning method between online learning and batch learning, in which the value function Q is updated every time a certain amount of learning data is accumulated.

The action information generation unit 543 generates the action a in the course of Q-learning, and outputs the generated action a to the action information output unit 530. Specifically, the action information generation unit 543 selects, for the current condition s, the action a in the course of Q-learning. The action a in the second embodiment includes how to change the oscillation condition from the current condition s.

The action information generation unit 543 may select an action a' by a well-known method such as a greedy method in which the action a' with the highest value Q(s,a) is selected from the currently-estimated actions a or a E-greedy method in which the action a' is randomly selected in the case of a certain low probability E and the action a' with the highest value Q(s,a) is selected in other cases.

The value function storage unit 550 is a storage device that stores the value function Q. The value function Q stored in the value function storage unit 550 is updated by the value function update unit 542.

Based on the value function Q updated by Q-learning by the value function update unit 542, the machine learning device 500 generates the action a (hereinafter referred to as "optimized action information") which is an oscillation condition where the machine tool 100 performs oscillation machining with the maximum value Q(s,a).

The oscillation condition output unit 560 acquires the value function Q stored in the value function storage unit 550. As described above, the value function Q is updated by Q-learning by the value function update unit 542. Based on the value function Q, the oscillation condition output unit 560 generates, as the optimized action information, an optimal oscillation condition where the surface roughness of the machined workpiece is optimized, and outputs the generated optimal oscillation condition (the optimized action information) to the numerical control device 200.

The oscillation condition output unit 560 has a chip shredding condition calculation unit 561 and an oscillation condition upper limit calculation unit 562.

The chip shredding condition calculation unit 561 calculates a chip shredding oscillation condition where chips from the workpiece can be shredded by oscillation machining with the machine tool 100. Then, the oscillation condition output unit 560 outputs the optimal oscillation condition satisfying the chip shredding oscillation condition.

The oscillation condition upper limit calculation unit 562 calculates an upper limit oscillation condition not exceeding a preset upper limit. Then, the oscillation condition output unit 560 outputs the optimal oscillation condition satisfying the upper limit oscillation condition.

The numerical control device 200 corrects the currently-set oscillation condition based on the optimal oscillation condition (the optimized action information) to generate an operation command, so that the machine tool 100 can be operated such that the surface roughness of the machined workpiece is minimized (optimized).

Next, processing of updating the value function by the machine learning device 500 will be described with reference to a flowchart of FIG. 5. FIG. 5 is the flowchart showing the flow of the value function update processing by the machine learning device 500 according to the second embodiment.

First, in Step S21, the condition setting acquisition unit 510 acquires, as the condition information, the condition setting from the numerical control device 200. The acquired condition setting is output to the value function update unit 542 and the action information generation unit 543. As described above, the condition setting (the condition information) is information equivalent to the environmental condition s in Q-learning.

In Step S22, the action information generation unit 543 generates the oscillation condition as new action information, and outputs the generated new action information (the action a) to the numerical control device 200 via the action information output unit 530. The numerical control device 200 having received the action information drives the machine tool 100 under the condition s' which is the oscillation condition changed from the current condition s based on the received action information, thereby performing oscillation machining for the workpiece. As described above, the action information is equivalent to the action a in Q-learning.

In Step S23, the determination information acquisition unit 520 acquires, as the determination information for calculating the reward in Q-learning, the surface roughness data on the workpiece machined with the machine tool 100.

In Step S24, the reward calculation unit 541 calculates the reward based on the received determination information (the surface roughness of the machined workpiece). The reward calculation unit 541 determines whether or not the surface roughness data on the machined workpiece is less than the predetermined threshold. In a case where the surface roughness data is less than the predetermined threshold (YES), the processing proceeds to Step S25. On the other hand, in a case where the surface roughness data exceeds the predetermined threshold (NO), the processing proceeds to Step S26.

In Step S25, the reward calculation unit 541 calculates the value of the reward as the positive value. In Step S26, the reward calculation unit 541 calculates the value of the reward as the negative value.

In Step S27, the value function update unit 542 updates, based on the value of the reward calculated as described above, the value function Q stored in the value function storage unit 550. Then, the processing returns to Step S21 again, and the learning unit 540 repeats the above-described processing to converge the value function Q to a proper value. Note that the learning unit 540 may end the above-described processing under the condition that the processing has been repeated a predetermined number of times or has been repeated for a predetermined time. Operation of the machine learning device 500 has been described above, but the processing of calculating the value of the reward is one example and is not limited to above.

Figure 6:
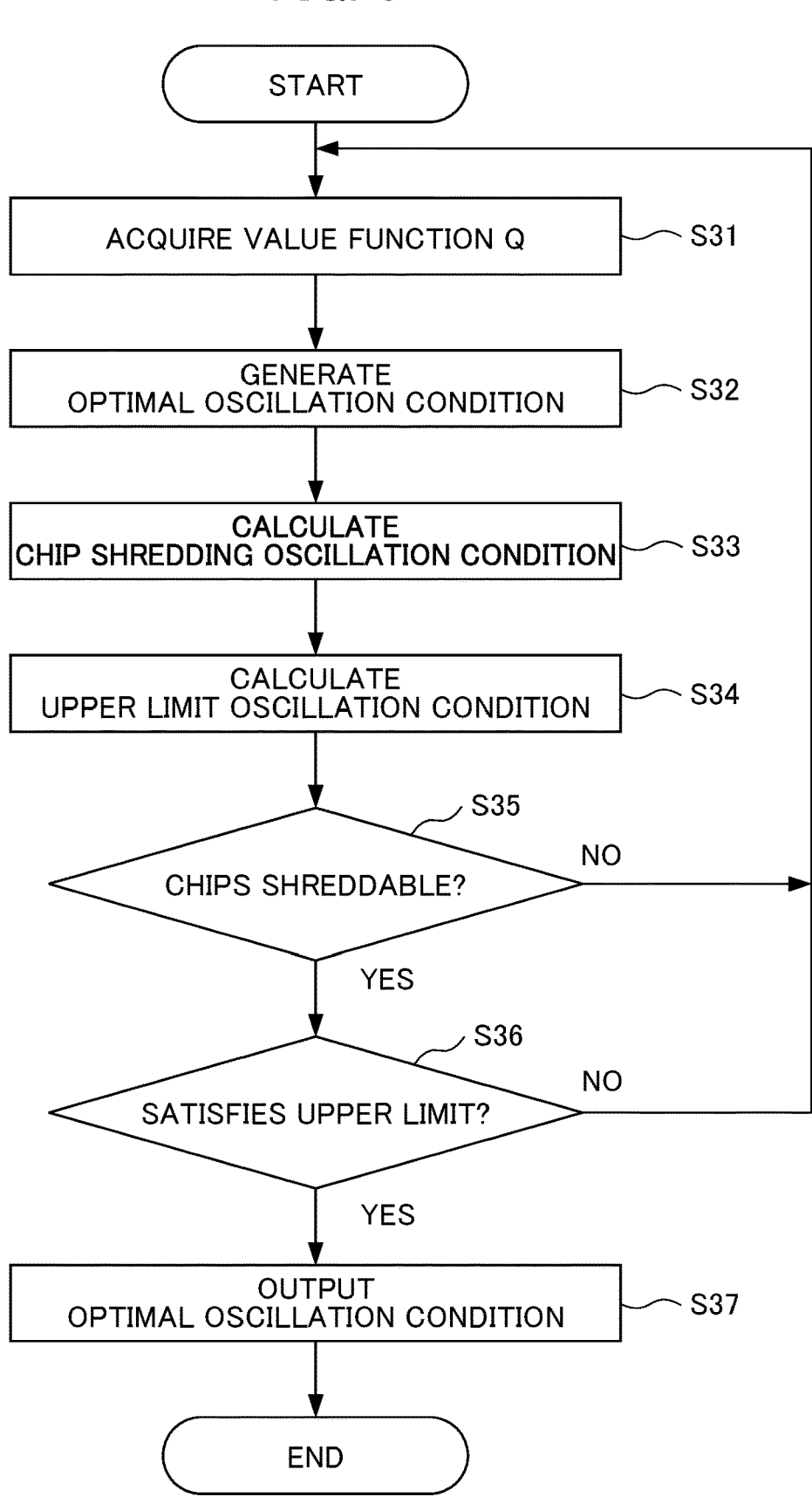
FIG. 6 is a flowchart showing the flow of oscillation condition output processing by the machine learning device according to the second embodiment.

FIG. 6 is a flowchart showing the flow of processing of outputting the oscillation condition by the machine learning device 500 according to the second embodiment. In Step S31, the oscillation condition output unit 560 acquires the value function Q stored in the value function storage unit 550. The value function Q is updated by Q-learning by the value function update unit 542 as described above.

In Step S32, based on the value function Q, the oscillation condition output unit 560 selects, as the optimal action, the action a with the highest value Q(s,a) from the actions a conceivable under, e.g., the currently-set condition s, thereby generating the optimal oscillation condition (the optimized action information).

In Step S33, the chip shredding condition calculation unit 561 calculates the chip shredding oscillation condition where the chips from the workpiece can be shredded by oscillation machining with the machine tool 100.

In Step S34, the oscillation condition upper limit calculation unit 562 calculates the upper limit oscillation condition not exceeding the preset upper limit.

In Step S35, the oscillation condition output unit 560 determines whether or not the optimal oscillation condition generated in Step S32 satisfies the chip shredding oscillation condition calculated in Step S33. In a case where the optimal oscillation condition satisfies the chip shredding oscillation condition (YES), the processing proceeds to Step S35. On the other hand, in a case where the optimal oscillation condition does not satisfy the chip shredding oscillation condition (NO), the processing proceeds to Step S31 again.

In Step S36, the oscillation condition output unit 560 determines whether or not the optimal oscillation condition output in Step S32 satisfies the upper limit oscillation condition calculated in Step S34. In a case where the optimal oscillation condition satisfies the upper limit oscillation condition (YES), the processing proceeds to Step S37. On the other hand, in a case where the optimal oscillation condition does not satisfy the upper limit oscillation condition (NO), the processing proceeds to Step S31 again.

In Step S32, the oscillation condition output unit 560 outputs the generated optimal oscillation condition (the optimized action information) to the numerical control device 200.

In the above-described manner, the numerical control device 200 corrects the currently-set condition s (i.e., the currently-set oscillation condition) based on the optimal oscillation condition, and generates the operation command. Then, the numerical control device 200 sends the generated operation command to the machine tool 100, and accordingly, the machine tool 100 can be operated such that the surface roughness data on the machined workpiece can be optimized (minimized).

As described above, the machine learning device 500 according to the second embodiment includes the condition setting acquisition unit 510 that acquires, as the condition information, the condition setting for oscillation machining, the determination information acquisition unit 520 that acquires, as the determination information, the surface roughness data on the workpiece machined with the machine tool 100, the action information output unit 530 that outputs the action information indicating how to change the oscillation condition from the current condition, the reward calculation unit 541 that calculates the value of the reward in reinforcement learning based on the determination information, the value function update unit 542 that updates the value function for setting the value of the oscillation condition for the machine tool 100 based on the condition information, the action information, and the reward, and the oscillation condition output unit 560 that outputs, based on the value function, the optimal oscillation condition where the surface roughness of the machined workpiece is optimized.

With this configuration, the machine learning device 500 can output the optimal oscillation condition which is optimized in consideration of the surface roughness as compared to a conventional technique in which an oscillation condition is difficult to be set considering a surface roughness. Moreover, the machine learning device 500 can automatically set the oscillation condition, and therefore, a burden on an operator can be reduced.

The reward calculation unit 541 calculates the reward as the positive value when the surface roughness data on the machined workpiece is less than the predetermined threshold, and calculates the reward as the negative value when the surface roughness data exceeds the predetermined threshold. With this configuration, the machine learning device 500 can determine the value of the reward considering the surface roughness data.

The reward calculation unit 541 determines the predetermined threshold based on the theoretical surface roughness approximate expression. With this configuration, the machine learning device 500 can determine the value of the reward considering a theoretical surface roughness.

The oscillation condition output unit 560 includes the chip shredding condition calculation unit 561 that calculates the chip shredding oscillation condition where the chips from the workpiece can be shredded, and the oscillation condition output unit 560 outputs the optimal oscillation condition satisfying the chip shredding oscillation condition. With this configuration, the machine learning device 500 can set the optimal oscillation condition which allows shredding of the chips and which is optimized in consideration of the surface roughness.

The oscillation condition output unit 560 includes the oscillation condition upper limit calculation unit 562 that calculates the upper limit oscillation condition not exceeding the preset upper limit, and the oscillation condition output unit 560 outputs the optimal oscillation condition satisfying the upper limit oscillation condition. With this configuration, the machine learning device 500 can set the optimal oscillation condition which allows shredding of the chips and which is optimized in consideration of the surface roughness, not exceeding the upper limit of the oscillation condition.

Third Embodiment

Next, a control system 20 according to a third embodiment will be described. Note that in description of the third embodiment, the same reference numerals are used to represent the same components as those of the first embodiment and description thereof will be omitted or simplified. The control system 20 according to the third embodiment is mainly different from the first embodiment in that the roundness of a machined workpiece is used instead of surface roughness data on the machined workpiece, and is similar to the first embodiment in the other components.

Figure 7:
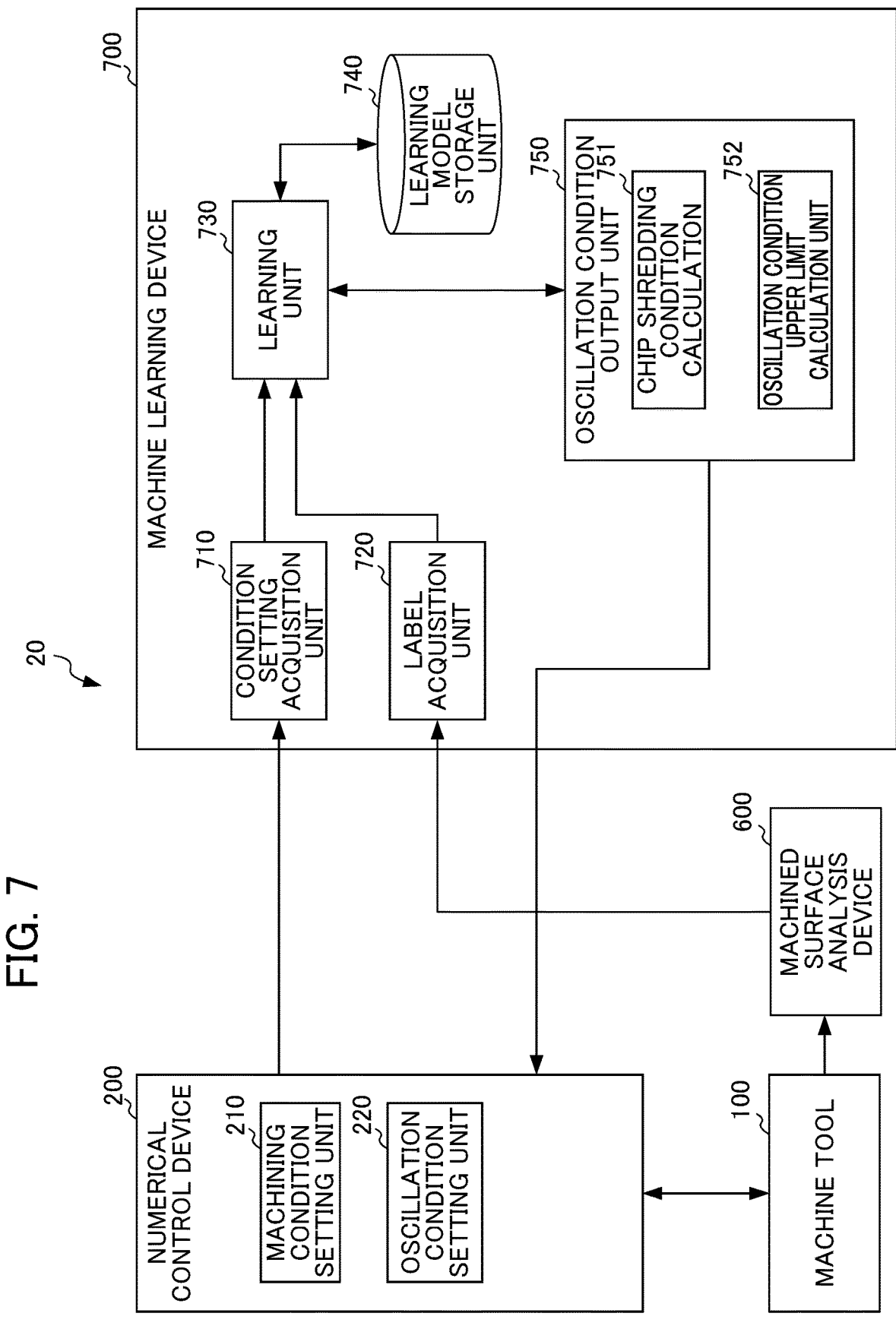
FIG. 7 is a diagram showing the outline of a control system according to a third embodiment.

FIG. 7 is a diagram showing the outline of the control system 20 according to the third embodiment. The control system 20 is intended to calculate an oscillation condition using machine learning to calculate an oscillation condition where air cutting can be performed with a tool of a machine tool 100 and favorable roundness data can be obtained.

The control system 20 includes the machine tool 100, a numerical control device 200, a machined surface analysis device 600, and a machine learning device 700. Here, the machine tool 100 and the numerical control device 200 are paired and connected so as to communicate with each other. Note that the machine tool 100 and the numerical control device 200 may be directly connected to each other via a connection interface or be connected to each other via a network such as a local area network (LAN).

The numerical control device 200, the machined surface analysis device 600, and the machine learning device 700 are directly connected to each other via connection interfaces or connected to each other via a network so as to communicate with each other. Note that the network includes, for example, a LAN built in a factory, the Internet, the public telephone network, or a combination thereof. A specific communication method in the network, a connection method, i.e., wired connection or wireless connection, etc. are not particularly limited.

The machine tool 100 and the numerical control device 200 have configurations similar to those of the first embodiment as described above. The machined surface analysis device 600 measures and calculates the roundness data on the workpiece machined with the machine tool 100, and outputs the calculated roundness data to the machine learning device 700.

The machine learning device 700 performs machine learning using a condition setting received from the numerical control device 200 and the roundness data received from the machined surface analysis device 600. Then, the machine learning device 700 performs machine learning, thereby building a learning model for outputting the oscillation condition. The machine learning device 700 includes a condition setting acquisition unit 710, a label acquisition unit 720, a learning unit 730, a learning model storage unit 740, and an oscillation condition output unit 750.

The condition setting acquisition unit 710 acquires, from the numerical control device 200, the condition setting including the machining and oscillation conditions for oscillation machining.

The label acquisition unit 720 acquires, as a label, the roundness data on the workpiece machined with the machine tool 100 from the machined surface analysis device 600. Here, the label is correct output corresponding to input in machine learning.

In this manner, the condition setting for oscillation machining and the label of the roundness data are paired as a learning target and input to the learning unit 730. This pair of condition setting and label is equivalent to teacher data in machine learning. Here, many pieces of teacher data for machine learning are preferably prepared.

The learning unit 730 performs machine learning based on the received teacher data, thereby building the learning model. That is, the learning unit 730 learns an oscillation condition where the roundness of the machined workpiece is optimized. The learning model built by the learning unit 730 is output to the learning model storage unit 740.

The learning model storage unit 740 stores the learning model learnt by the learning unit 730. The learning model stored in the learning model storage unit 740 is utilized by the oscillation condition output unit 750. Note that in a case where the teacher data is newly acquired after the learning model has been built, the learning unit 730 may further perform supervised learning on the learning model stored in the learning model storage unit 740, thereby updating the learning model built once.

The machine learning device 700 may share the learning model stored in the learning model storage unit 740 with other machine learning devices. In a case where the learning model is shared by the plurality of machine learning devices, supervised learning can be further performed in a distributed manner by the machine learning devices, and therefore, the efficiency and accuracy of supervised learning can be improved.

The oscillation condition output unit 750 outputs, based on the learning model stored in the learning model storage unit 740, the optimal oscillation condition where the roundness of the machined workpiece is optimized. The oscillation condition output unit 750 has a chip shredding condition calculation unit 751 and an oscillation condition upper limit calculation unit 752.

The chip shredding condition calculation unit 751 calculates a chip shredding oscillation condition where chips from the workpiece can be shredded by oscillation machining with the machine tool 100. The oscillation condition output unit 750 outputs, based on the learning model, the optimal oscillation condition satisfying the chip shredding oscillation condition.

The oscillation condition upper limit calculation unit 752 calculates an upper limit oscillation condition not exceeding a preset upper limit. The oscillation condition output unit 750 outputs, based on the learning model, the optimal oscillation condition satisfying the upper limit oscillation condition.

Next, processing of building the learning model by the machine learning device 700 will be described with reference to a flowchart of FIG. 8. FIG. 8 is the flowchart showing the flow of the learning model building processing by the machine learning device 700 according to the third embodiment.

In Step S41, the condition setting acquisition unit 710 acquires, from the numerical control device 200, the condition setting including the machining and oscillation conditions for oscillation machining.

In Step S42, the label acquisition unit 720 acquires, as the label, the roundness data on the workpiece machined with the machine tool 100 from the machined surface analysis device 600.

In Step S43, after having received the teacher data which is the pair of condition setting and label, the learning unit 730 executes machine learning based on the received teacher data. The learning unit 730 executes machine learning using the received teacher data. The learning unit 730 performs supervised learning by, e.g., regression analysis, a neural network, a least-squares method, or a stepwise method.

In Step S44, the learning unit 730 determines whether or not supervised learning is to be ended. Here, a condition for ending supervised learning can be set as necessary. For example, in a case where the value of an error between the output of the neural network and the label is a predetermined value or less, the learning unit 730 may end supervised learning. In a case where supervised learning has been repeated a preset number of times, the learning unit 730 may end supervised learning. In a case where supervised learning is to be ended (YES), the processing proceeds to Step S45. On the other hand, in a case where supervised learning is not to be ended (NO), the processing proceeds to Step S43.

In Step S45, the learning unit 730 outputs the learning model built up to this point by supervised learning to the learning model storage unit 740, and the learning model storage unit 740 stores the learning model. In a case where new teacher data has been acquired, the machine learning device 700 can further perform machine learning for the learning model. Thereafter, the machine learning device 700 ends this processing.

Figure 9:
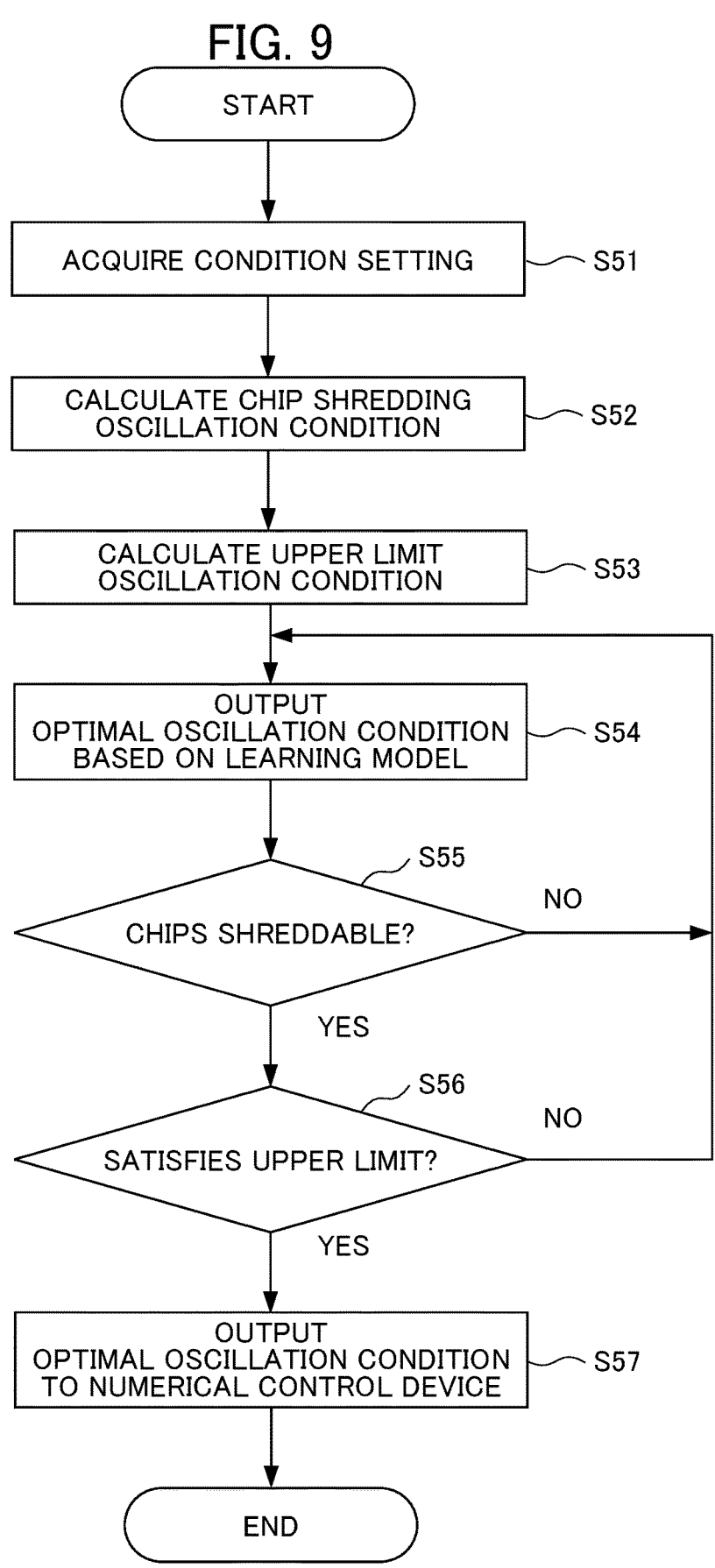
FIG. 9 is a flowchart showing the flow of oscillation condition output processing by the machine learning device according to the third embodiment.

Next, processing of outputting the oscillation condition by the machine learning device 700 will be described with reference to a flowchart of FIG. 9. FIG. 9 is the flowchart showing the flow of the oscillation condition output processing by the machine learning device 700 according to the third embodiment.

In Step S51, the condition setting acquisition unit 710 acquires, from the numerical control device 200, the condition setting including the machining and oscillation conditions for oscillation machining.

In Step S52, the chip shredding condition calculation unit 751 calculates the chip shredding oscillation condition where the chips from the workpiece can be shredded by oscillation machining with the machine tool 100. In Step S53, the oscillation condition upper limit calculation unit 752 calculates the upper limit oscillation condition not exceeding the preset upper limit.

In Step S54, the oscillation condition output unit 750 outputs the optimal oscillation condition where the roundness of the machined workpiece is optimized, based on the condition setting acquired in Step S51 and the learning model stored in the learning model storage unit 740.

In Step S55, the oscillation condition output unit 750 determines whether or not the optimal oscillation condition output in Step 353 satisfies the chip shredding oscillation condition calculated in Step 352. In a case where the optimal oscillation condition satisfies the chip shredding oscillation condition (YES), the processing proceeds to Step 356. On the other hand, in a case where the optimal oscillation condition does not satisfy the chip shredding oscillation condition (NO), the processing proceeds to Step 354 again.

In Step S56, the oscillation condition output unit 750 determines whether or not the optimal oscillation condition output in Step S53 satisfies the upper limit oscillation condition calculated in Step S53. In a case where the optimal oscillation condition satisfies the upper limit oscillation condition (YES), the processing proceeds to Step S56. On the other hand, in a case where the optimal oscillation condition does not satisfy the upper limit oscillation condition (NO), the processing proceeds to Step S54 again.

In Step S57, the oscillation condition output unit 750 outputs the optimal oscillation condition to the numerical control device 200, and thereafter, the processing ends.

As described above, the machine learning device 700 according to the third embodiment includes the condition setting acquisition unit 710 that acquires the condition setting for oscillation machining, the label acquisition unit 720 that acquires, as the label, the roundness data on the workpiece machined with the machine tool 100, and the learning unit 730 that performs supervised learning using the pair of condition setting and label as the teacher data. The learning unit 730 includes the learning model for learning the oscillation condition where the roundness of the machined workpiece is optimized.

With this configuration, the machine learning device 700 can learn the optimal oscillation condition which is optimized in consideration of the roundness as compared to a conventional technique in which an oscillation condition is difficult to be set considering a roundness.

The machine learning device 700 further includes the oscillation condition output unit 750 that outputs, based on the learning model, the optimal oscillation condition where the roundness of the machined workpiece is optimized. With this configuration, the machine learning device 700 can output the optimal oscillation condition which is optimized in consideration of the roundness as compared to the conventional technique in which the oscillation condition is difficult to be set considering the roundness. Moreover, the machine learning device 700 can automatically set the oscillation condition, and therefore, a burden on an operator can be reduced.

The oscillation condition output unit 750 includes the chip shredding condition calculation unit 751 that calculates the chip shredding oscillation condition where the chips from the workpiece can be shredded, and the oscillation condition output unit 750 outputs, based on the learning model, the optimal oscillation condition satisfying the chip shredding oscillation condition. With this configuration, the machine learning device 700 can set the optimal oscillation condition which allows shredding of the chips and which is optimized in consideration of the roundness.

The oscillation condition output unit 750 includes the oscillation condition upper limit calculation unit 752 that calculates the upper limit oscillation condition not exceeding the preset upper limit, and the oscillation condition output unit 750 outputs, based on the learning model, the optimal oscillation condition satisfying the upper limit oscillation condition. With this configuration, the machine learning device 700 can set the optimal oscillation condition which allows shredding of the chips and which is optimized in consideration of the roundness, not exceeding the upper limit of the oscillation condition.

Fourth Embodiment

Next, a control system 30 according to a fourth embodiment will be described. Note that in description of the fourth embodiment, the same reference numerals are used to represent the same components as those of the third embodiment and description thereof will be omitted or simplified. The control system 30 according to the fourth embodiment is mainly different from the third embodiment in that reinforcement learning is used instead of supervised learning, and is similar to the third embodiment in the other components.

Figure 10:
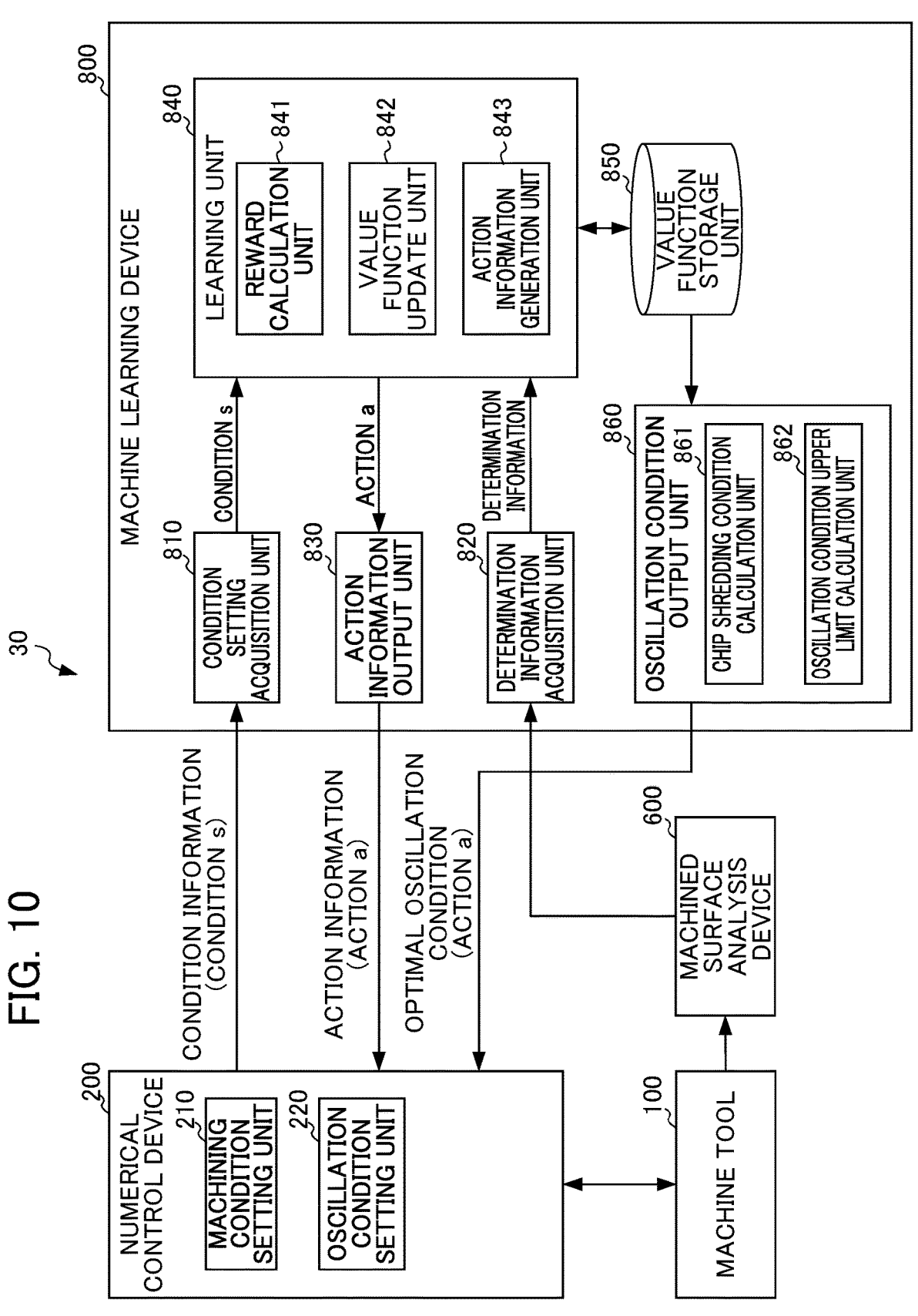
FIG. 10 is a diagram showing the outline of a control system according to a fourth embodiment.

FIG. 10 is a diagram showing the outline of the control system 30 according to the fourth embodiment. The control system 30 is intended to calculate an oscillation condition using machine learning to calculate an oscillation condition where air cutting can be performed with a tool of a machine tool 100 and favorable roundness data can be obtained.

The control system 30 includes the machine tool 100, a numerical control device 200, a machined surface analysis device 600, and a machine learning device 800. Here, the machine tool 100 and the numerical control device 200 are paired and connected so as to communicate with each other. Note that the machine tool 100 and the numerical control device 200 may be directly connected to each other via a connection interface or be connected to each other via a network such as a local area network (LAN).

The numerical control device 200, the machined surface analysis device 600, and the machine learning device 800 are directly connected to each other via connection interfaces or connected to each other via a network so as to communicate with each other. Note that the network includes, for example, a LAN built in a factory, the Internet, the public telephone network, or a combination thereof. A specific communication method in the network, a connection method, i.e., wired connection or wireless connection, etc. are not particularly limited.

The machine tool 100, the numerical control device 200, and the machined surface analysis device 600 have configurations similar to those of the third embodiment as described above.

The machine learning device 800 is a device that performs reinforcement learning. Note that processing relating to reinforcement learning is similar to that by the machine learning device 500 according to the second embodiment, and therefore, description thereof will be omitted. In order to perform reinforcement learning, the machine learning device 800 includes a condition setting acquisition unit 810, a determination information acquisition unit 820, an action information output unit 830, a learning unit 840, a value function storage unit 850, and an oscillation condition output unit 860.

From the numerical control device 200, the condition setting acquisition unit 810 acquires, as condition information (a condition s), a condition setting (e.g., a machining condition and the oscillation condition) set in the numerical control device 200. The condition s is equivalent to an environmental condition s in Q-learning.

Specifically, the condition s in the fourth embodiment indicates the condition setting (e.g., the machining and oscillation conditions) set in the numerical control device 200. The condition setting includes a machining condition including the rotation speed of the machine tool 100 about a main axis, the feed speed of the machine tool 100, etc. and an oscillation condition including the oscillation amplitude, oscillation frequency, etc. of the machine tool 100.

The determination information acquisition unit 820 acquires determination information for calculating a reward in Q-learning. Specifically, the determination information acquisition unit 820 acquires, as the determination information for calculating the reward in Q-learning, roundness data on a workpiece machined with the machine tool 100.

The action information output unit 830 transmits action information (an action a) generated by the learning unit 840 to the numerical control device 200. As described above, the numerical control device 200 changes the current condition s, i.e., the currently-set condition setting, based on the action a, thereby causing the condition s to transition to a subsequent condition s' (i.e., a condition when the machine tool 100 is operated under the changed oscillation condition).

The learning unit 840 learns a value Q(s,a) when a certain action a is selected under a certain environmental condition s. Specifically, the learning unit 840 includes a reward calculation unit 841, a value function update unit 842, and an action information generation unit 843.

The reward calculation unit 841 calculates, based on the determination information, the reward when the action a is selected under the certain condition s. Here, the reward calculation unit 841 calculates the reward as a positive value when the roundness data on the machined workpiece is less than a predetermined threshold, and calculates the reward as a negative value when the roundness data exceeds the predetermined threshold.

The value function update unit 842 performs Q-learning based on the condition s, the action a, the condition s' when the action a is applied to the condition s, and the value of the reward calculated as described above, thereby updating a value function Q stored in the value function storage unit 850.

The value function Q may be updated by online learning, batch learning, or mini-batch learning.

The action information generation unit 843 generates the action a in the course of Q-learning, and outputs the generated action a to the action information output unit 830. Specifically, the action information generation unit 843 selects, for the current condition s, the action a in the course of Q-learning. The action a in the fourth embodiment includes how to change the oscillation condition from the current condition s.

The action information generation unit 843 may select an action a' by a well-known method such as a greedy method in which the action a' with the highest value Q(s,a) is selected from the currently-estimated actions a or a F-greedy method in which the action a' is randomly selected in the case of a certain low probability e and the action a' with the highest value Q(s,a) is selected in other cases.

The value function storage unit 850 is a storage device that stores the value function Q. The value function Q stored in the value function storage unit 850 is updated by the value function update unit 842.

Based on the value function Q updated by Q-learning by the value function update unit 842, the machine learning device 800 generates the action a (hereinafter referred to as "optimized action information") which is an oscillation condition where the machine tool 100 performs oscillation machining with the maximum value Q(s,a).

The oscillation condition output unit 860 acquires the value function Q stored in the value function storage unit 850. As described above, the value function Q is updated by Q-learning by the value function update unit 842. Based on the value function Q, the oscillation condition output unit 860 generates, as the optimized action information, the optimal oscillation condition where the roundness of the machined workpiece is optimized, and outputs the generated optimal oscillation condition (the optimized action information) to the numerical control device 200.

The oscillation condition output unit 860 has a chip shredding condition calculation unit 861 and an oscillation condition upper limit calculation unit 862.

The chip shredding condition calculation unit 861 calculates a chip shredding oscillation condition where chips from the workpiece can be shredded by oscillation machining with the machine tool 100. Then, the oscillation condition output unit 860 outputs the optimal oscillation condition satisfying the chip shredding oscillation condition.

The oscillation condition upper limit calculation unit 862 calculates an upper limit oscillation condition not exceeding a preset upper limit. Then, the oscillation condition output unit 860 outputs the optimal oscillation condition satisfying the upper limit oscillation condition.

The numerical control device 200 corrects the currently-set oscillation condition based on the optimal oscillation condition (the optimized action information) to generate an operation command, so that the machine tool 100 can be operated such that the roundness of the machined workpiece is optimized.

Next, processing of updating the value function by the machine learning device 800 will be described with reference to a flowchart of FIG. 11. FIG. 11 is the flowchart showing the flow of the value function update processing by the machine learning device 800 according to the fourth embodiment.

First, in Step S61, the condition setting acquisition unit 810 acquires, as the condition information, the condition setting from the numerical control device 200. The acquired condition setting is output to the value function update unit 842 and the action information generation unit 843. As described above, the condition setting (the condition information) is information equivalent to the environmental condition s in Q-learning.

In Step S62, the action information generation unit 843 generates the oscillation condition as new action information, and outputs the generated new action information (the action a) to the numerical control device 200 via the action information output unit 830. The numerical control device 200 having received the action information drives the machine tool 100 under the condition s' which is the oscillation condition changed from the current condition s based on the received action information, thereby performing oscillation machining for the workpiece. As described above, the action information is equivalent to the action a in Q-learning.

In Step S63, the determination information acquisition unit 820 acquires, as the determination information for calculating the reward in Q-learning, the roundness data on the workpiece machined with the machine tool 100.

In Step S64, the reward calculation unit 831 calculates the reward based on the received determination information (the roundness data on the machined workpiece). The reward calculation unit 841 determines whether or not the roundness data on the machined workpiece is less than the predetermined threshold. In a case where the roundness data is less than the predetermined threshold (YES), the processing proceeds to Step S65. On the other hand, in a case where the roundness data exceeds the predetermined threshold (NO), the processing proceeds to Step S66.

In Step S65, the reward calculation unit 841 calculates the value of the reward as the positive value. In Step S66, the reward calculation unit 841 calculates the value of the reward as the negative value.

In Step S67, the value function update unit 842 updates, based on the value of the reward calculated as described above, the value function Q stored in the value function storage unit 850. Then, the processing returns to Step S61 again, and the learning unit 840 repeats the above-described processing to converge the value function Q to a proper value. Note that the learning unit 840 may end the above-described processing under the condition that the processing has been repeated a predetermined number of times or has been repeated for a predetermined time. Operation of the machine learning device 800 has been described above, but the processing of calculating the value of the reward is one example and is not limited to above.

FIG. 12 is a flowchart showing the flow of processing of outputting the oscillation condition by the machine learning device 800 according to the fourth embodiment. In Step S71, the oscillation condition output unit 860 acquires the value function Q stored in the value function storage unit 850. The value function Q is updated by Q-learning by the value function update unit 842 as described above.

In Step S72, based on the value function Q, the oscillation condition output unit 860 selects, as the optimal action, the action a with the highest value Q(s,a) from the actions a conceivable under, e.g., the currently-set condition s, thereby generating the optimal oscillation condition (the optimized action information).

In Step 373, the chip shredding condition calculation unit 861 calculates the chip shredding oscillation condition where the chips from the workpiece can be shredded by oscillation machining with the machine tool 100.

In Step S74, the oscillation condition upper limit calculation unit 862 calculates the upper limit oscillation condition not exceeding the preset upper limit.

In Step S75, the oscillation condition output unit 860 determines whether or not the optimal oscillation condition generated in Step S72 satisfies the chip shredding oscillation condition calculated in Step S73. In a case where the optimal oscillation condition satisfies the chip shredding oscillation condition (YES), the processing proceeds to Step S75. On the other hand, in a case where the optimal oscillation condition does not satisfy the chip shredding oscillation condition (NO), the processing proceeds to Step S71 again.

In Step S76, the oscillation condition output unit 860 determines whether or not the optimal oscillation condition output in Step S72 satisfies the upper limit oscillation condition calculated in Step S74. In a case where the optimal oscillation condition satisfies the upper limit oscillation condition (YES), the processing proceeds to Step S77. On the other hand, in a case where the optimal oscillation condition does not satisfy the upper limit oscillation condition (NO), the processing proceeds to Step S71 again.

In Step S72, the oscillation condition output unit 860 outputs the generated optimal oscillation condition (the optimized action information) to the numerical control device 200.

In the above-described manner, the numerical control device 200 corrects the currently-set condition s (i.e., the currently-set oscillation condition) based on the optimal oscillation condition, and generates the operation command. Then, the numerical control device 200 sends the generated operation command to the machine tool 100, and accordingly, the machine tool 100 can be operated such that the roundness data on the machined workpiece can be optimized.

As described above, the machine learning device 800 according to the fourth embodiment includes the condition setting acquisition unit 810 that acquires, as the condition information, the condition setting for oscillation machining, the determination information acquisition unit 820 that acquires, as the determination information, the roundness data on the workpiece machined with the machine tool 100, the action information output unit 830 that outputs the action information indicating how to change the oscillation condition from the current condition, the reward calculation unit 841 that calculates the value of the reward in reinforcement learning based on the determination information, the value function update unit 842 that updates the value function for setting the value of the oscillation condition for the machine tool 100 based on the condition information, the action information, and the reward, and the oscillation condition output unit 860 that outputs, based on the value function, the optimal oscillation condition where the roundness of the machined workpiece is optimized.

With this configuration, the machine learning device 800 can output the optimal oscillation condition which is optimized in consideration of the roundness as compared to a conventional technique in which an oscillation condition is difficult to be set considering a roundness. Moreover, the machine learning device 800 can automatically set the oscillation condition, and therefore, a burden on an operator can be reduced.

The reward calculation unit 841 calculates the reward as the positive value when the roundness data on the machined workpiece is less than the predetermined threshold, and calculates the reward as the negative value when the roundness data exceeds the predetermined threshold. With this configuration, the machine learning device 800 can determine the value of the reward considering the roundness data.

The oscillation condition output unit 860 includes the chip shredding condition calculation unit 861 that calculates the chip shredding oscillation condition where the chips from the workpiece can be shredded, and the oscillation condition output unit 860 outputs the optimal oscillation condition satisfying the chip shredding oscillation condition. With this configuration, the machine learning device 800 can set the optimal oscillation condition which allows shredding of the chips and which is optimized in consideration of the roundness.

The oscillation condition output unit 860 includes the oscillation condition upper limit calculation unit 862 that calculates the upper limit oscillation condition not exceeding the preset upper limit, and the oscillation condition output unit 860 outputs the optimal oscillation condition satisfying the upper limit oscillation condition. With this configuration, the machine learning device 800 can set the optimal oscillation condition which allows shredding of the chips and which is optimized in consideration of the roundness, not exceeding the upper limit of the oscillation condition.

Other Embodiments

In the above-described embodiments, the machine learning device 400, 500, 700, 800 uses the surface roughness data or roundness data on the machined workpiece, but machine learning devices according to other embodiments may use other types of data as evaluation data on the machined workpiece. For example, in the machine learning devices according to the other embodiments, the evaluation data on the machined workpiece may include the surface roughness, the roundness, or a dimensional accuracy. Here, the dimensional accuracy indicates whether or not the workpiece is machined with a shape and dimensions as specified by the machining program.

That is, in the case of using supervised learning, each of the machine learning devices according to the other embodiments is a machine learning device for learning an oscillation condition for a machine tool that performs oscillation machining while oscillating a tool and a workpiece relative to each other. The machine learning device includes a condition setting acquisition unit that acquires a condition setting for the oscillation machining, a label acquisition unit that acquires, as a label, evaluation data on the workpiece machined with the machine tool, and a learning unit that performs supervised learning using a pair of condition setting and label as teacher data. The learning unit includes a learning model for learning an oscillation condition where the evaluation data on the machined workpiece is optimized. The machine learning device may further include an oscillation condition output unit that outputs, based on the learning model, an optimal oscillation condition where the evaluation data on the machined workpiece is optimized.

With this configuration, the machine learning device can output the optimal oscillation condition which is optimized in consideration of the evaluation data on the machined workpiece as compared to a conventional technique in which an oscillation condition is difficult to be set considering evaluation data on a machined workpiece. Moreover, the machine learning device can automatically set the oscillation condition, and therefore, a burden on an operator can be reduced.

In the case of using reinforcement learning, each of the machine learning devices according to the other embodiments is a machine learning device for learning an oscillation condition for a machine tool that performs oscillation machining while oscillating a tool and a workpiece relative to each other. The machine learning device includes a condition setting acquisition unit that acquires, as condition information, a condition setting for oscillation machining, a determination information acquisition unit that acquires, as determination information, evaluation data on the workpiece machined with the machine tool, an action information output unit that outputs action information indicating how to change the oscillation condition from a current condition, a reward calculation unit that calculates the value of a reward in reinforcement learning based on the determination information, a value function update unit that updates a value function for setting the value of the oscillation condition for the machine tool based on the condition information, the action information, and the reward, and an oscillation condition output unit that outputs, based on the value function, an optimal oscillation condition where the evaluation data on the machined workpiece is optimized. Moreover, the reward calculation unit calculates the reward as a positive value when the evaluation data on the machined workpiece is less than a predetermined threshold, and calculates the reward as a negative value when the evaluation data exceeds the predetermined threshold.

With this configuration, the machine learning device can output the optimal oscillation condition which is optimized in consideration of the evaluation data on the machined workpiece as compared to a conventional technique in which an oscillation condition is difficult to be set considering evaluation data on a machined workpiece. Moreover, the machine learning device can automatically set the oscillation condition, and therefore, a burden on an operator can be reduced.

The condition setting according to the first to fourth embodiments includes the machining condition including at least one selected from the tool feed speed, the rotation speed about the main axis, the coordinate value, the tool blade edge, or the tool type in the machine tool 100 and the workpiece material, and the oscillation condition including at least one selected from the oscillation frequency or oscillation amplitude of the machine tool 100. With this configuration, the machine learning device 400, 500, 700, 800 can acquire a proper condition setting including machining and oscillation conditions.

The surface roughness data according to the first and second embodiments includes at least one selected from the arithmetic average roughness, the maximum height, the maximum peak height, the maximum valley depth, the average height, the maximum peak-to-valley height, or the load length ratio. With this configuration, the machine learning device 400, 500 can acquire the surface roughness data by a proper method.

The machine learning device 400, 500, 700, 800 may be shared by the plurality of numerical control devices 200. With this configuration, the machine learning device 400, 500, 700, 800 can update the learning model, the value function, etc. and share the learning model, the value function, etc. with the plurality of numerical control devices 200.

The machine learning device 400, 500, 700, 800 may be provided on a cloud server. With this configuration, the machine learning device 400, 500, 700, 800 can update the learning model, the value function, etc. and share the learning model, the value function, etc. on the cloud server.

Each of the numerical control device 200 and the machine learning devices 400, 500, 700, 800 as described above includes an arithmetic processing unit such as a central processing unit (CPU). Moreover, each of the numerical control device 200 and the machine learning devices 400, 500, 700, 800 also includes an auxiliary storage device, such as a hard disk drive (HDD), that stores various control programs such as application software and an operating system (OS) and a main storage device, such as a random access memory (RAM), that stores data temporarily required for execution of the program by the arithmetic processing unit.

Each of the numerical control device 200 and the machine learning devices 400, 500, 700, 800 reads the application software or the OS from the auxiliary storage device by the arithmetic processing unit, and performs arithmetic processing based on the application software or the OS while loading the read application software or OS into the main storage device. Further, each of the numerical control device 200 and the machine learning devices 400, 500, 700, 800 controls various types of hardware included therein based on an arithmetic processing result. In this manner, the functional blocks of the present embodiment are implemented. That is, the above-described embodiments can be implemented by cooperation of the hardware and the software.

As a specific example, the numerical control device 200 can be implemented in such a manner that application software for implementing the embodiment is incorporated into a control device of a general machine tool 100. The machine learning device 400, 500, 700, 800 can be implemented in such a manner that application software for implementing the present embodiment is incorporated into a general personal computer.

Note that for the machine learning device 400, 500, 700, 800, the amount of arithmetic processing accompanied by machine learning is great, and therefore, a graphics processing unit (GPU) is preferably mounted on the personal computer and utilized for the arithmetic processing accompanied by machine learning by a technique called a general-purpose computing on graphics processing unit (GPGPU) because high-speed processing is allowed. Further, in order to perform higher-speed processing, the machine learning device 400, 500 may build a computer cluster using a plurality of computers with GPUs such that the plurality of computers included in the computer cluster perform parallel processing.

The embodiments of the present invention have been described above, and the control systems 1, 10, 20, 30 described above may be implemented by hardware, software, or a combination thereof. The control methods performed by the control systems 1, 10, 20, 30 described above may also be implemented by hardware, software, or a combination thereof. Here, implementation by the software means implementation by reading and execution of a program by a computer.

The program can be stored using various types of non-transitory computer readable media and be supplied to the computer. The non-transitory computer readable media include various types of tangible storage media. Examples of the non-transitory computer readable media include magnetic recording media (e.g., a hard disk drive), magnetic optical recording media (e.g., a magnetic optical disk), a CD-read only memory (CD-ROM), a CD-R, a CD-R/W, and semiconductor memories (e.g., a mask ROM, a programmable ROM (PROM), an erasable PROM (EPROM), a flash ROM, and a random access memory (RAM)).

Each embodiment described above is a preferable embodiment of the present invention, but the scope of the present invention is not limited only to each embodiment above. Various changes can be made without departing from the gist of the present invention.

EXPLANATION OF REFERENCE NUMERALS

1 Control System
10 Control System

100 Machine Tool
200 Numerical control Device
300 Machined Surface Analysis Device
400 Machine Learning Device
410 Condition Setting Acquisition Unit
420 Label Acquisition Unit
430 Learning Unit
440 Learning Model Storage Unit
450 Oscillation Condition Output Unit
500 Machine Learning Device
510 Condition Setting Acquisition Unit
520 Determination Information Acquisition Unit
530 Action Information Output Unit
540 Learning Unit
550 Value Function Storage Unit
560 Oscillation Condition Output Unit

The invention claimed is:

1. A computer device for learning an oscillation condition for a machine tool that performs oscillation machining while oscillating a tool and a workpiece relative to each other, comprising:
a processor,
wherein the processor is configured to:
acquire a condition setting for the oscillation machining;
acquire as a label, evaluation data on the workpiece machined with the machine tool, the evaluation data on the machined workpiece including data on a surface roughness, roundness, or dimensional accuracy of the machined workpiece; and
perform supervised learning using a pair of the condition setting and the label as teacher data,
wherein the processor includes a learning model for learning an oscillation condition where the evaluation data on the machined workpiece is optimized to minimize the surface roughness of the machined workpiece, minimize the roundness of the machined workpiece, or maximize a dimensional accuracy of the machined workpiece.

2. The computer device according to claim 1, the processor outputs, based on the learning model, an optimal oscillation condition where the evaluation data on the machined workpiece is optimized.

3. The computer device according to claim 2, wherein
the processor calculates a chip shredding oscillation condition where a chip from the workpiece can be shredded, and
the processor outputs, based on the learning model, the optimal oscillation condition satisfying the chip shredding oscillation condition.

4. The computer device according to claim 2, wherein
the processor calculates an upper limit oscillation condition not exceeding a preset upper limit, and
the processor outputs, based on the learning model, the optimal oscillation condition satisfying the upper limit oscillation condition.

5. The computer device according to claim 1, wherein
the condition setting includes a machining condition including at least one selected from a tool feed speed, a rotation speed about a main axis, a coordinate value, a tool blade edge, or a tool type in the machine tool and a workpiece material, and
the oscillation condition including at least one selected from an oscillation frequency or an oscillation amplitude of the machine tool.

6. The computer device according to claim 1, wherein the computer device is shared by a plurality of numerical control devices.

7. The computer device according to claim 1, wherein the computer device is provided on a cloud server.

8. A compute device for learning an oscillation condition for a machine tool that performs oscillation machining while oscillating a tool and a workpiece relative to each other, comprising:

a processor, wherein the processor is configured to:

acquire as condition information, a condition setting for the oscillation machining;

acquire as determination information, evaluation data on the workpiece machined with the machine tool, the evaluation data on the machined workpiece including data on a surface roughness, roundness, or dimensional accuracy of the machined workpiece;

output action information indicating how to change the oscillation condition from a current condition;

calculate a value of a reward in reinforcement learning based on the determination information;

update a value function for setting a value of the oscillation condition for the machine tool based on the condition information, the action information, and the reward;

and output based on the value function, an optimal oscillation condition where the evaluation data on the machined workpiece is optimized to minimize the surface roughness of the machined workpiece, minimize the roundness of the machined workpiece, or maximize a dimensional accuracy of the machined workpiece.

9. The computer device according to claim 8, wherein the processor calculates the reward as a positive value when the evaluation data on the machined workpiece is less than a predetermined threshold, and calculates the reward as a negative value when the evaluation data exceeds the predetermined threshold.

10. The computer device according to claim 9, wherein in a case where the evaluation data is the surface roughness on the machined workpiece, the processor determines the predetermined threshold based on a theoretical surface roughness approximate expression.

11. The computer device according to claim 10, wherein the surface roughness includes at least one selected from an arithmetic average roughness, a maximum height, a maximum peak height, a maximum valley depth, an average height, a maximum peak-to-valley height, or a load length ratio.

12. The computer device according to claim 8, wherein the processor calculates a chip shredding oscillation condition where a chip from the workpiece can be shredded, and the processor outputs the optimal oscillation condition satisfying the chip shredding oscillation condition.

13. The computer device according to claim 8, wherein the processor calculates an upper limit oscillation condition not exceeding a preset upper limit, and the processor outputs the optimal oscillation condition satisfying the upper limit oscillation condition.

* * * * *